United States Patent
Park et al.

(10) Patent No.: US 7,623,682 B2
(45) Date of Patent: Nov. 24, 2009

(54) METHOD AND DEVICE FOR MOTION ESTIMATION AND COMPENSATION FOR PANORAMA IMAGE

(75) Inventors: Gwang-Hoon Park, Seongnam-si (KR); Sung-Ho Son, Gwangmyeong-si (KR)

(73) Assignees: Samsung Electronics Co., Ltd., Suwon-si (KR); Industry Academic Cooperation Foundation Kyunghee University, Youngin-si (KY)

( * ) Notice: Subject to any disclaimer, the term of this patent is extended or adjusted under 35 U.S.C. 154(b) by 620 days.

(21) Appl. No.: 11/201,196

(22) Filed: Aug. 11, 2005

(65) Prior Publication Data

US 2006/0034529 A1 Feb. 16, 2006

(30) Foreign Application Priority Data

Aug. 13, 2004 (KR) ...................... 10-2004-0063889
Aug. 9, 2005 (KR) ...................... 10-2005-0072968

(51) Int. Cl.
*G06K 9/00* (2006.01)
(52) U.S. Cl. .................................................... 382/107
(58) Field of Classification Search ................ 382/100, 382/154, 232, 236, 276, 278, 279, 293, 294, 382/295, 300, 107; 348/36, 42, 154, 155; 345/474
See application file for complete search history.

(56) References Cited

U.S. PATENT DOCUMENTS

| 6,026,195 | A | 2/2000 | Eifrig et al. |
| 6,043,838 | A | 3/2000 | Chen |
| 6,259,732 | B1 | 7/2001 | Lee |
| 6,272,254 | B1 | 8/2001 | Kaup |
| 6,591,018 | B2 * | 7/2003 | Okuno et al. ............... 382/243 |
| 6,771,304 | B1 * | 8/2004 | Mancuso et al. .............. 348/39 |

* cited by examiner

*Primary Examiner*—Samir A Ahmed
*Assistant Examiner*—Atiba O Fitzpatrick
(74) *Attorney, Agent, or Firm*—Roylance, Abrams, Berdo & Goodman, L.L.P.

(57) ABSTRACT

Provided are a method and device for motion estimation and compensation to be performed on a panorama image. The motion estimation and compensation are performed on a panorama image with a 360° omni-directional view based on the spatial relation between left and right borders of the panorama image being very high. Accordingly, it is possible to improve image quality through effective and precise estimation and compensation for the motion of a panorama image. In particular, it is possible to improve the image quality at the right and left edges of the panorama image.

18 Claims, 16 Drawing Sheets

FIG. 1 (PRIOR ART)

| D | B | C |
|---|---|---|
| A | X |   |

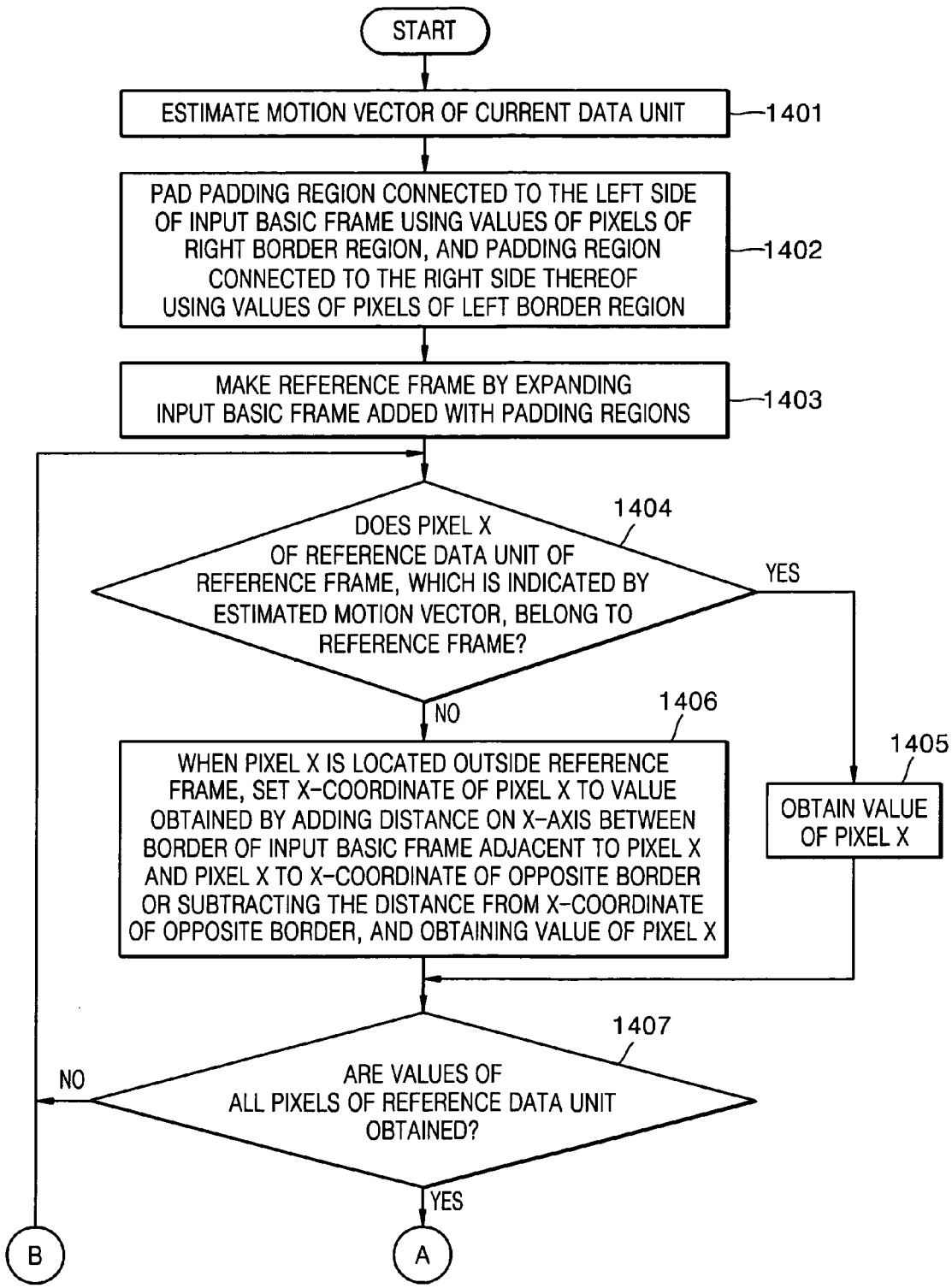

METHOD AND DEVICE FOR MOTION ESTIMATION AND COMPENSATION FOR PANORAMA IMAGE

CROSS-REFERENCE TO RELATED PATENT APPLICATIONS

This application claims the benefit under 35 U.S.C. §119 (a) of Korean Patent Application Nos. 10-2004-63889, filed on Aug. 13, 2004, and 10-2005-0072968, filed on Aug. 9, 2005, in the Korean Intellectual Property Office, the entire disclosures of both of which are hereby incorporated by reference.

BACKGROUND OF THE INVENTION

1. Field of the Invention

The present invention relates to motion estimation and compensation for a panorama image. More particularly, the present invention relates to a method and apparatus for estimating the motion of a panorama image containing 360° omni-directional image information, and a method and apparatus for compensating for the motion of the panorama image.

2. Description of the Related Art

An omni-directional video camera system is capable of acquiring a 360° omni-directional view from a single viewpoint. The omni-directional video camera system includes a camera to which a special mirror such as a hyperboloid mirror or a special lens such as a fish-eye lens is installed, or can include a plurality of cameras to acquire a 360° view.

Three-dimensional (3D) realistic broadcasting may be applied to omni-directional video coding. As an example of a 3D realistic broadcasting service, a viewer's terminal receives all image information regarding scenes viewed from diverse viewpoints such as the viewpoints of a pitcher, a catcher, a hitter, and an audience on the first base side in a baseball game and the viewer can select a desired viewpoint and view a scene from the desired viewpoint.

An image captured by the omni-directional camera system has characteristics corresponding to a 3D cylindrical environment and thus is transformed into a two-dimensional (2D) plane image. In this case, the 2D plane image is a panorama image with a 360° omni-directional view and omni-directional video coding is performed on the 2D panorama image.

In a motion estimation technique, which is one image coding technique, a motion vector is computed by detecting a data unit, which is most similar to a data unit in a current frame, from a previous frame using a predetermined evaluation function, the motion vector represents the position difference between the data units, and, in general, 16×16 macro blocks are used as the data blocks but the sizes of macro blocks are not limited, and for instance, the data units may be 16×8, 8×16, or 8×8 macro blocks, or any other suitable blocks.

A conventional motion estimation technique performed in units of 16×16 macro blocks will now be described in greater detail. First, a motion vector of a current macro block is predicted using a plurality of previous macro blocks adjacent to the current macro block. FIG. 1 illustrates a plurality macro blocks A, B, C, and D used to estimate the motion vector of a current macro block X. The previous macro blocks A through D are encoded before coding of the current macro block X.

However, sometimes, some of previous macro blocks adjacent to the current macro block X are unavailable in estimating the motion vector of the current macro block X according to the position of the current macro block X in the current frame. FIG. 2A illustrates such a case where the previous macro blocks B, C, and D required for estimation of the motion vector of the current macro block X are not present. In this case, the motion vector of the current macro block X is set to 0.

FIG. 2B illustrates a case where the previous macro blocks A and D are not present. In this case, the motion vectors of the previous macro blocks A and D are set to 0, and the motion vector of the current macro block X is set to the median value of the motion vectors of the previous macro blocks A through D.

FIG. 2C illustrates a case where the previous macro block C is not present. In this case, the motion vector of the previous macro block C is set to 0, and the motion vector of the current macro block X is set to the median value of the motion vectors of the previous macro blocks A through D.

After predicting the motion vector of the current macro block X, the similarity between each reference macro block in a reference frame indicated by the predicted motion vector and the current macro block X is computed using a predetermined evaluation function. Next, a reference frame that is most similar to the current macro block X is detected from the reference frame within a predetermined search range. In general, a sum of absolute differences (SAD) function, a sum of absolute transformed differences (SATD) function, or a sum of squared differences (SSD) function is used as the predetermined evaluation function.

During detection of the most similar reference macro block within the predetermined search range, some or all pixels of the most similar reference macro block may be present outside the most similar reference macro block. In this case, as illustrated in FIG. 3, motion estimation and compensation are performed after padding the values of pixels on the left and right borders of the most similar reference macro block pixels to the outside of the left and right borders, respectively. This motion estimation and compensation is referred to as motion estimation and compensation in an unrestricted motion vector (UMV) mode.

FIG. 4A illustrates a cylindrical image with a 360° omni-directional view. FIG. 4B illustrates a panorama image with a 360° omni-directional view, taken along the line X of the cylindrical image of FIG. 4A. Referring to FIG. 4B, a left side A and a right side B of a human-shaped object shown in FIG. 4A are positioned at the right and left borders of the panorama image, respectively. That is, the spatial relation between the right and left borders of the panorama image with the 360° omni-directional view is very high.

Thus, it is ineffective to perform the conventional motion estimation and compensation on a panorama image with an omni-directional view without considering the characteristics of the panorama image. Thus, a method of effectively estimating and compensating for the motion of a panorama image with an omni-directional view is required.

SUMMARY OF THE INVENTION

The present invention provides a method and apparatus for effectively and precisely estimating the motion of a panorama image containing omni-directional image information.

The present invention also provides a method and apparatus for effectively and precisely compensating for the motion of the above panorama image.

According to an aspect of the present invention, there is provided a method of estimating a motion of a panorama image containing 360° omni-directional view information. The method includes padding a padding region connected to the left side of a basic reference frame to be used for motion estimation of the panorama image using a right border region of the basic reference frame. The method further includes padding a padding region connected to the right side of the basic reference frame using a left border region thereof, and making a reference frame by expanding the padded basic reference frame. The method continues with estimating a motion vector of a current data unit of the panorama image, using motion vectors of a plurality of previous data units adjacent to the current data unit. Values of all pixels of a reference data unit indicated by the estimated motion vector from the reference frame by obtaining a value of a sub pixel when the sub pixel belongs to the reference frame are determined An x-coordinate of the sub pixel is set to a value obtained by adding a distance on an x-axis between a border of the basic reference frame adjacent to the sub pixel and the sub pixel to an x-coordinate of the opposite border or subtracting the distance from the x-coordinate of the opposite border. The value of the sub pixel is obtained when the sub pixel is located outside the reference frame. A similarity between the current data unit and the reference data unit using a predetermined evaluation function is determined.

According to another aspect of the present invention, there is provided a method of estimating a motion of a panorama image containing 360° omni-directional view information. The method includes padding a padding region connected to the left side of a basic reference frame to be used for motion estimation of the panorama image using values of pixels of a left border region of the basic reference frame. A padding region connected to the right side of the basic reference frame is padded using values of pixels of a right border region thereof. A reference frame is made by expanding the padded basic reference frame. A motion vector of a current data unit of the panorama image is estimated using motion vectors of a plurality of previous data units adjacent to the current data unit. Values of all pixels of a reference data unit indicated by the estimated motion vector from a reference frame are determined by obtaining a value of a sub pixel when the sub pixel belongs to the reference frame. An x-coordinate of the sub pixel is set to a value obtained by adding a distance on an x-axis between a border of the basic reference frame adjacent to the sub pixel and the sub pixel to an x-coordinate of the opposite border or subtracting the distance from the x-coordinate of the opposite border, and obtaining the value of the sub pixel, when the sub pixel is located outside the basic reference frame. A similarity between the current data unit and the reference data unit is determined using a predetermined evaluation function.

According to yet another aspect of the present invention, there is provided an apparatus for estimating a motion of a panorama image containing 360° omni-directional view information. The apparatus comprises a memory for storing a reference frame and motion vectors of a plurality of previous data units adjacent to a current data unit of the panorama image. The reference frame is obtained by padding a padding region connected to the left side of a basic reference frame to be used for motion estimation of the panorama image using a right border region of the basic reference frame, padding a padding region connected to the right side of the basic reference frame using a left border region thereof, and making a reference frame by expanding the padded basic reference frame. A motion estimating unit estimates a motion vector of the current data unit using the motion vectors of the previous data units. Values of all pixels of the reference data unit indicated by the estimated motion vector from the reference frame are determined by obtaining a value of the sub pixel when a sub pixel indicated by the estimated motion vector belongs to the reference frame. An x-coordinate of the sub pixel is set to a value obtained by adding a distance on an x-axis between a border adjacent the basic reference frame adjacent to the sub pixel and the sub pixel to an x-coordinate of the opposite border or subtracting the distance from the x-coordinate of the opposite border, and obtaining the value of the sub pixel, when the sub pixel is located outside the reference frame. A similarity between the current data unit and the reference data unit is determined using a predetermined evaluation function.

According to still another aspect of the present invention, there is provided an apparatus for estimating a motion of a panorama image containing 360° omni-directional view information. The apparatus comprises a memory for storing a reference frame and motion vectors of a plurality of previous data units adjacent to a current data unit of the panorama image. The reference frame is obtained by padding a padding region connected to the left side of a basic reference frame to be used for motion estimation of the panorama image using values of pixels of a left border region of the basic reference frame, padding a padding region connected to the right side of the basic reference frame using values of pixels of a right border region thereof, and making a reference frame by expanding the padded basic reference frame. A motion estimating unit estimates a motion vector of the current data unit using the motion vectors of the previous data units. Values of all pixels of the reference data unit indicated by the estimated motion vector from the reference frame are determined by obtaining a value of the sub pixel when a sub pixel indicated by the estimated motion vector belongs to the basic reference frame of the reference frame. An x-coordinate of the sub pixel is set to a value obtained by adding a distance on an x-axis between a border adjacent the basic reference frame adjacent to the sub pixel and the sub pixel to an x-coordinate of the opposite border or subtracting the distance from the x-coordinate of the opposite border, and obtaining the value of the sub pixel, when the sub pixel is located outside the basic reference frame. A similarity between the current data unit and the reference data unit is determined using a predetermined evaluation function.

According to yet another aspect of the present invention, there is provided a method of compensating for a motion of a panorama image containing 360° omni-directional view information. The method comprises padding a padding region connected to the left side of a basic reference frame to be used for motion compensation for the panorama image using a right border region of the basic reference frame, padding a padding region connected to the right side of the basic reference frame using a left border region thereof, and making a reference frame by expanding the padded basic reference frame. A motion vector of a current data unit of the panorama image is received. Values of all pixels of the reference data unit indicated by the estimated motion vector from the reference frame are determined by obtaining a value of a sub pixel of a reference data unit indicated by the motion vector of the current data unit when the sub pixel belongs to the reference frame. An x-coordinate of the sub pixel is set to a value obtained by adding a distance on an x-axis between a border of the basic reference frame adjacent to the sub pixel and the sub pixel to an x-coordinate of the opposite border or subtracting the distance from the x-coordinate of the opposite border, and obtaining the value of the sub pixel, when the sub pixel is located outside the reference frame. The current data unit is reproduced using the values of the pixels of the reference data unit.

According to still another aspect of the present invention, there is provided a method of compensating for a motion of a panorama image containing 360° omni-directional view information. The method comprises padding a padding region connected to the left side of a basic reference frame to be used for motion compensation for the panorama image using values of pixels of a left border region, padding a padding region connected to the right side thereof using values of pixels of a right border region, and making a reference frame by expanding the padded basic reference frame. A motion vector of a current data unit of the panorama image is received. Values of all pixels of a reference data unit indicated by the received motion vector from the reference frame are determined by obtaining a value of a sub pixel when the sub pixel belongs to the basic reference frame of the reference frame. An x-coordinate of the sub pixel is set to a value obtained by adding a distance on an x-axis between a border of the basic reference frame adjacent to the sub pixel and the sub pixel to an x-coordinate of the opposite border or by subtracting the distance from the x-coordinate of the opposite border, and obtaining the value of the sub pixel, when the sub pixel is located outside the basic reference frame. The current data unit is reproduced using the values of the pixels of the reference data unit.

According to still another aspect of the present invention, there is provided an apparatus for compensating for a motion of a panorama image containing 360° omni-directional view information. The apparatus comprises a memory for storing a reference frame obtained by padding a padding region connected to the left side of a basic reference frame to be used for motion compensation for the panorama image using a right border region, padding a padding region connected to the right side of the basic reference frame using a left border region, and making a reference frame by expanding the padded basic reference frame. A motion compensating unit receives a motion vector of a current data unit of the panorama image. Values of all pixels of a reference data unit indicated by the received motion vector are determined from the reference frame by obtaining a value of a sub pixel when the sub pixel belongs to the reference frame, and setting the value of the sub pixel to a value obtained by adding a distance on an x-axis between a border of the basic reference frame adjacent to the sub pixel and the sub pixel to an x-coordinate of the opposite border or subtracting the distance from the x-coordinate of the opposite border, and obtaining the value of the sub pixel when the sub pixel is located outside the reference frame. The current data unit is reproduced using the pixel values of the reference data unit.

According to still another aspect of the present invention, there is provided an apparatus for compensating for the motion of a panorama image containing 360° omni-directional view information. The apparatus comprises a memory for storing a reference frame obtained by padding a padding region connected to the left side of a basic reference frame to be used for compensation for the panorama image using values of pixels of a left border region, padding a padding region connected to the right side thereof using values of pixels of a right border region, and making a reference frame by expanding the padded basic reference frame. A motion compensating unit receives a motion vector of a current data unit of the panorama image, determines values of all pixels of a reference data unit indicated by the received motion vector from the reference frame by obtaining a value of a sub pixel when the sub pixel belongs to the basic reference frame of the reference frame, and sets an x-coordinate of the sub pixel to a value obtained by adding a distance on an x-axis between a border of the basic reference frame adjacent to the sub pixel and the sub pixel to an x-coordinate of the opposite border or subtracting the distance from the x-coordinate of the opposite border, and obtains the value of the sub pixel when the sub pixel is located outside the basic reference frame. The current data unit is reproduced using the pixel values of the reference data unit.

BRIEF DESCRIPTION OF THE DRAWINGS

The above and other aspects and advantages of the present invention will become more apparent by describing in detail exemplary embodiments thereof with reference to the attached drawings in which:

FIG. 1 is a diagram illustrating a plurality of previous macro blocks available for conventional estimation of a motion vector for a current macro block;

FIGS. 2A through 2C are diagrams illustrating cases where conventional macro blocks to be used for estimation of a motion vector of a current macro block are not present;

FIGS. 14A and 14B are a flowchart illustrating a method of detecting motion of a sub pixel according to another embodiment of the present invention;

Throughout the drawings, like reference numbers should be understood to refer to like elements, features and structures.

DETAILED DESCRIPTION OF EXEMPLARY EMBODIMENTS

Hereinafter, exemplary embodiments of the present invention will be described in detail with reference to the accompanying drawings.

Figure 5:
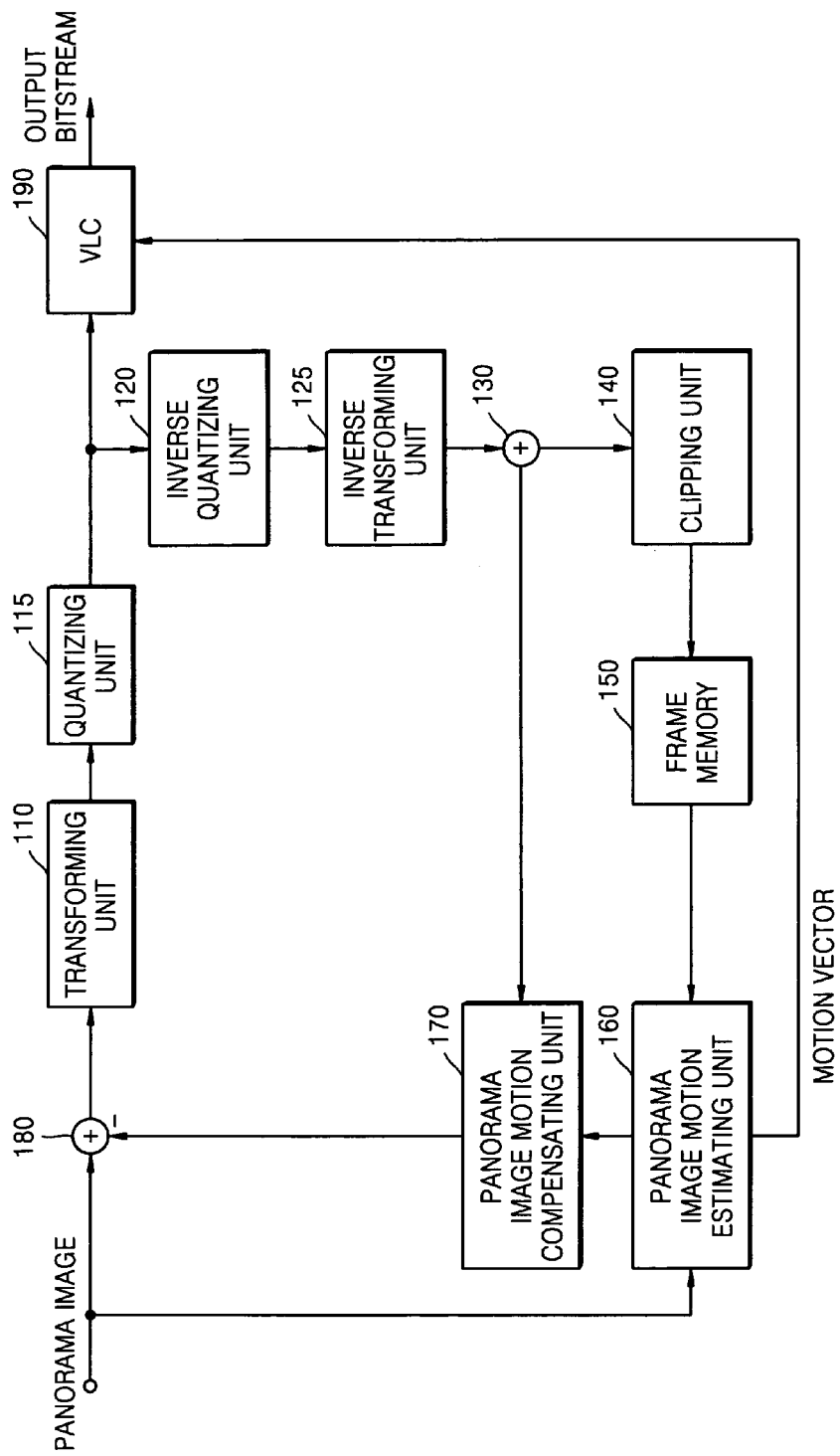
FIG. 5 is a block diagram of an encoding unit that encodes a motion vector of a panorama image according to an embodiment of the present invention.

FIG. 5 is a block diagram of an encoding unit that encodes a motion vector of a panorama image according to an embodiment of the present invention. Referring to FIG. 5, the encoding unit includes a transforming unit 110, a quantizing unit 115, an inverse quantizing unit 120, an inverse transforming unit 125, an adding unit 130, a clipping unit 140, a frame memory 150, a panorama image motion estimating unit 160, a panorama image motion compensating unit 170, a subtraction unit 180, and a variable-length coder (VLC) 190.

The transforming unit 110 receives an input panorama image, and transforms it through predetermined transformation to output transform coefficients. The input panorama image is a panorama image with a 360° omni-directional view such as that shown in FIG. 4B, taken along the line X of the cylindrical image shown in FIG. 4A. The predetermined transform performed by the transforming unit 110 may for example be a discrete cosine transform (DCT) in units of 8×8 blocks.

The quantizing unit 115 quantizes the transform coefficients received from the transforming unit 110. After the quantized transform coefficients are inversely quantized by the inverse quantizing unit 120 and inversely transformed by the inverse transforming unit 125, the input panorama image is reproduced. The reproduced panorama image is normalized by the clipping unit 140 and stored in the frame memory 150. The panorama image stored in the frame memory 150 is used as a reference panorama image in motion estimation and compensation of a newly input panorama image.

The panorama image motion estimation unit 160 performs motion estimation according to an embodiment of the present invention, using the reference panorama image stored in the frame memory 150. Specifically, the panorama image motion estimation unit 160 receives information regarding a current panorama image, obtains a motion vector of the current panorama image by performing motion estimation on the current panorama image using the reference panorama image stored in the frame memory 150, and outputs the motion vector to the VLC 190. Motion estimation and compensation are performed in units of predetermined blocks referred to as data units. In this embodiment, it is assumed that the data units are 16×16 macro blocks.

The panorama image motion compensation unit 170 performs motion compensation according to an embodiment of the present invention. In detail, panorama image motion compensation unit 170 receives the motion vector of the current macro block from the panorama image motion estimating unit 160, and outputs a reference macro block corresponding to the current macro block to the subtraction unit 180. The subtraction unit 180 outputs a residual signal between the current macro block and the reference macro block to the transforming unit 110. The residual signal is transformed by the transforming unit 110, quantized by the quantizing unit 115, and variable-length coded by the VLC 190. The motion vector of the current macro block generated by the panorama image motion estimating unit 160 is input directly to and variable-length coded by the VLC 190.

Figure 6A:
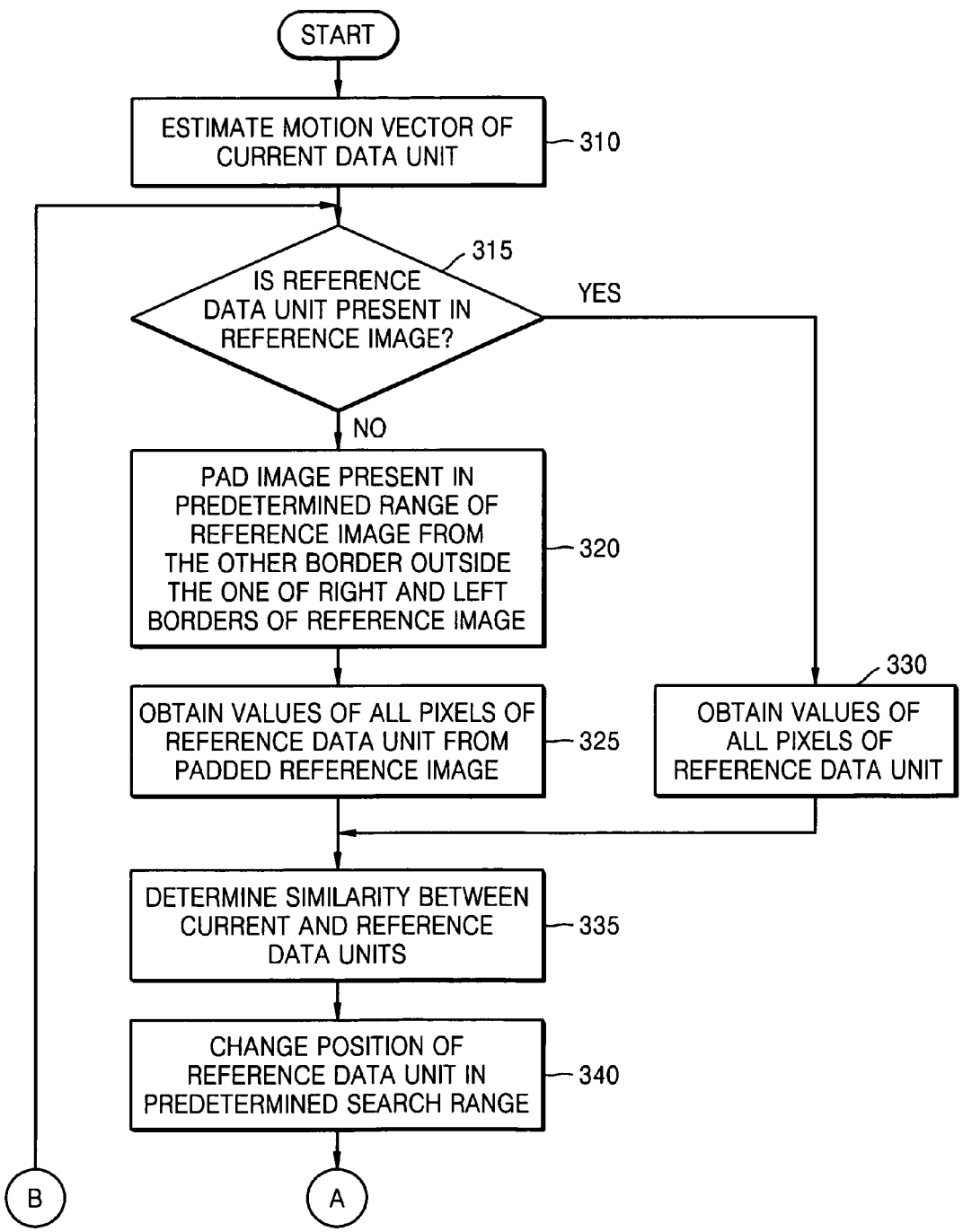
FIGS. 6A and 6B are a flowchart of a method of estimating the motion of a panorama image according to an embodiment of the present invention.
Figure 6B:
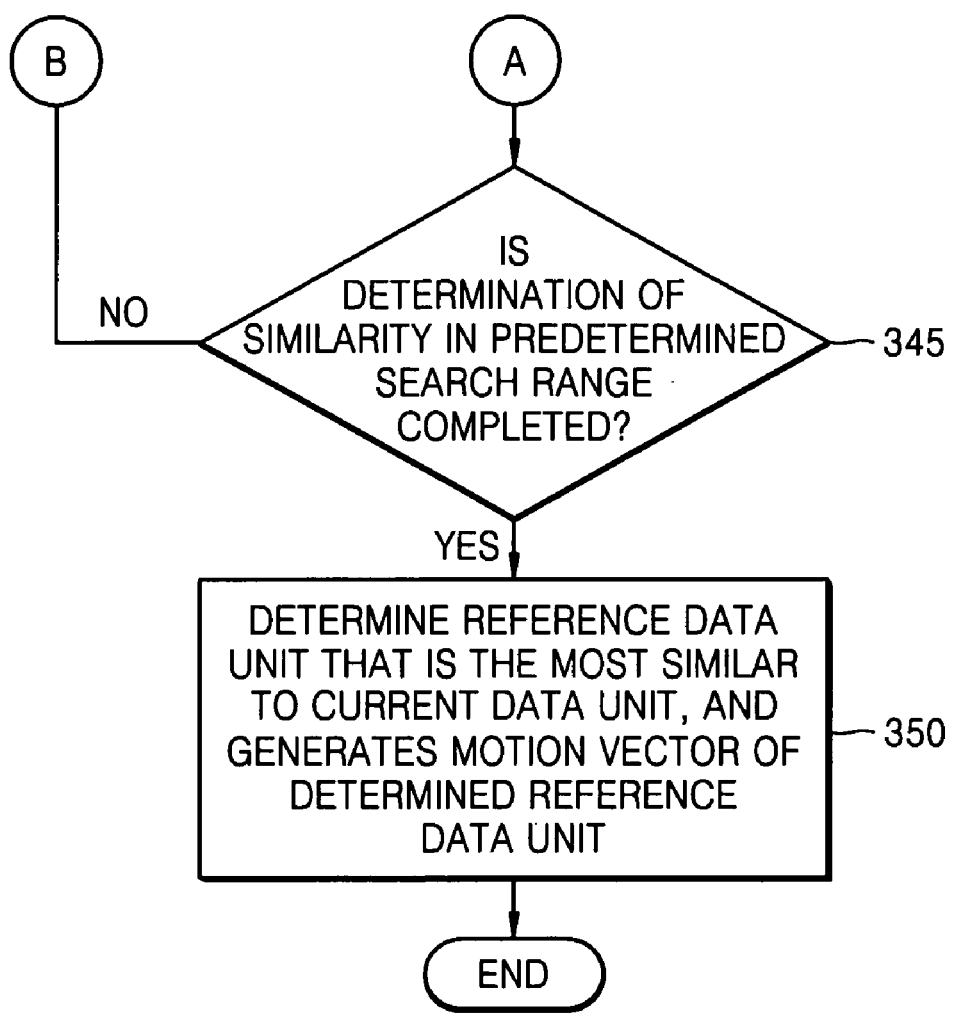

The operation of the panorama image motion estimating unit 160 will now be described in greater detail with reference to FIGS. 6A and 6B. FIGS. 6A and 6B are a flowchart illustrating a method of estimating the motion of a panorama image for searching for integer pixel values according to an embodiment of the present invention. Referring to FIGS. 6A and 6B, the panorama image motion estimating unit 160 estimates a motion vector of a current data unit using motion vectors of a plurality of previous data units adjacent to the current data unit (310). As illustrated in FIG. 1, the data unit X is a current data unit, and the data units A, B, C and D are previous data units required for estimation of a motion vector of the current data unit X. In this embodiment, the data units are 16×16 macro blocks.

In detail, the panorama image motion estimation unit 160 detects the motion vectors of the previous macro block A, B, C, and D stored in an internal memory (not shown). When all the previous macro block A through D are present, the motion vector of the current macro block X is estimated according to predetermined or conventional motion estimation, using the detected motion vectors.

Figure 7A:
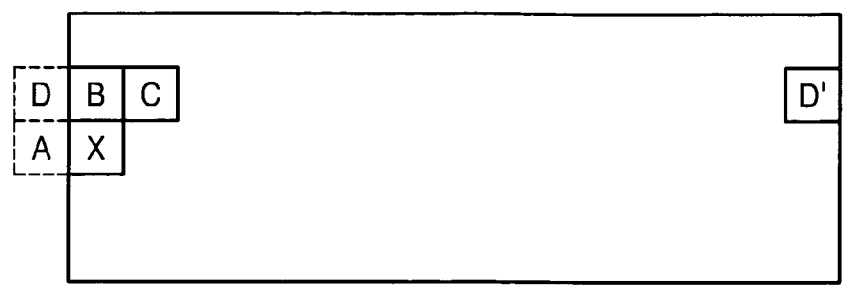
FIG. 7A is a diagram illustrating selection of previous macro blocks to be used for estimation of a motion vector of a current macro block according to an embodiment of the present invention.
Figure 7B:
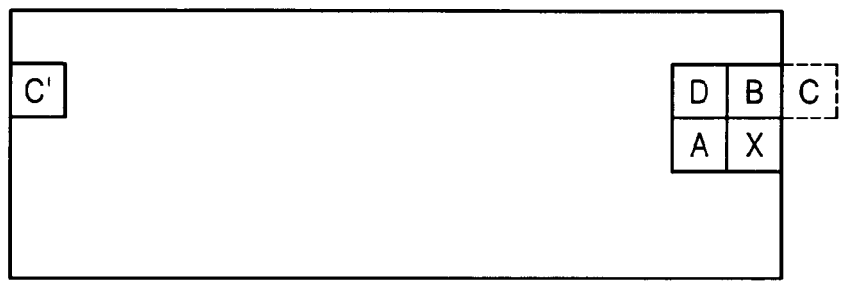
FIG. 7B is a diagram illustrating selection of previous macro blocks to be used for estimation of a motion vector of a current macro block according to another embodiment of the present invention.

However, at least one of the previous macro blocks A through D may not be present. FIG. 7A illustrates a case where the previous macro blocks A and D are not present in a panorama image, and thus, their motion vectors are unavailable for motion estimation of the current macro block X. FIG. 7B illustrates a case where the previous macro block C is not present in a panorama image, and thus, its motion vector is unavailable for motion estimation of the current macro block X.

As described above, the spatial relation between the right and left borders of a panorama image with a 360° omni-directional view is very high. That is, the distance between the right and left borders of the panorama image is substantially 0. According to an embodiment of the present invention, when some of the previous macro blocks A, C, and D required for estimation of the motion vector of the current macro block X are not present, motion vectors of previous macro blocks required for motion estimation are determined using the above characteristics of the panorama image. For instance, referring to FIG. 7A, a previous macro block D' at a right side of the panorama image and on a Y-axis on which the previous macro block D is positioned is substantially the same as the previous macro block D. Accordingly, a motion vector of the previous macro block D' is considered to be the same as that of the previous macro block D and can be used in estimation of the motion vector of the current macro block X. In contrast, the motion of a previous macro block at a right side of the panorama image and on an Y-axis on which the previous macro block A is positioned, is predicted after motion estimation of the current macro block X, and thus does not have an available motion vector. Accordingly, the motion vector of the previous macro block A required for estimation of the motion vector of the current macro block X is set to 0.

Referring to FIG. 7B, a previous macro block C' at a left side of the panorama image and on a Y-axis on which the previous macro block C is positioned, is substantially the same as the previous macro block C. Thus, a motion vector of the previous macro block C' is considered the same as that of the macro block C and thus is used in estimation of the motion vector of the current macro block X.

Referring back to FIGS. 6A and 6B, after estimating the motion vector of the current macro block X in operation 310, the panorama image motion estimation unit 160 determines whether a reference macro block indicated by the estimated motion vector is present in a reference frame (315). The reference frame is stored in the frame memory 150.

If all pixels of the reference macro block indicated by the motion vector of the current macro block X are present in the reference frame, all the pixels of the reference macro block are fetched from the frame memory 150 (330), and the similarity between the current macro block X and the reference macro block is determined using a predetermined evaluation function (335).

However, when some or all the pixels of the reference macro block indicated by the motion vector of the current macro block X are present outside one of the right and left borders of the reference frame, an image present in a predetermined range of the reference frame from the other border is padded outside the one of the right and left borders (320).

Figure 8A:
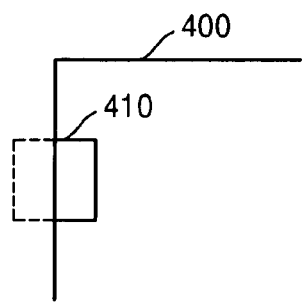
FIG. 8A is a diagram illustrating a case where a reference macro block partially overlaps with a reference frame.
Figure 8B:
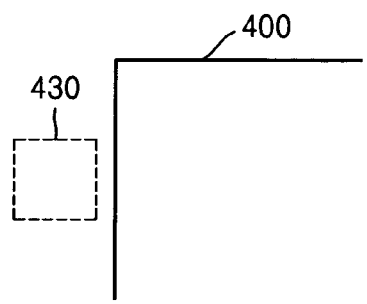
FIG. 8B is a diagram illustrating a case where a reference macro block is positioned outside a reference frame.

FIG. 8A illustrates a case where the reference macro block is positioned at a border of the reference frame. FIG. 8B illustrates a case where the reference macro block is positioned outside the reference frame.

Figure 3:
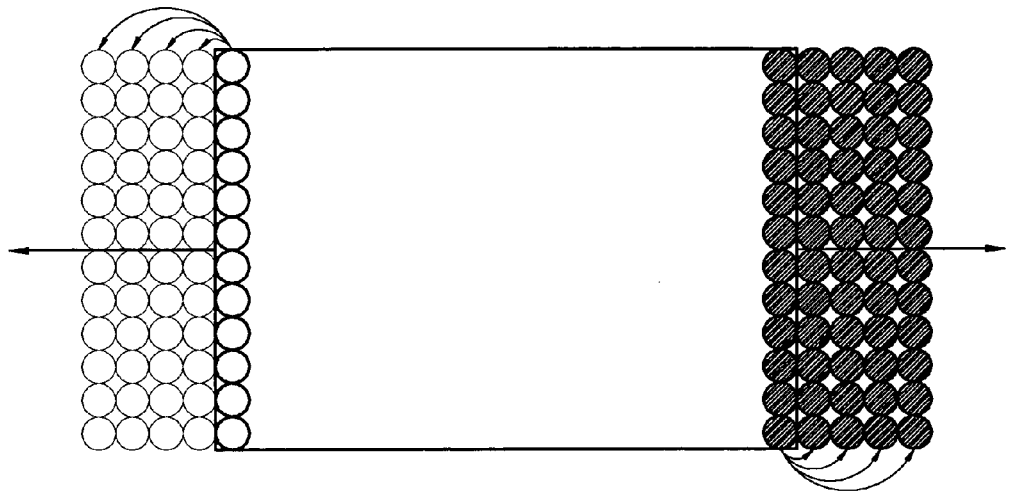
FIG. 3 is a diagram illustrating a conventional method of padding a reference frame.
Figure 9:
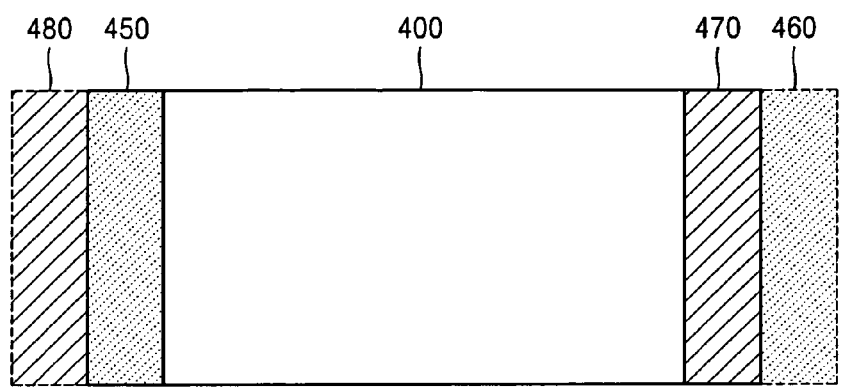
FIG. 9 is a diagram illustrating a method of padding a reference frame according to an embodiment of the present invention.

Referring to FIG. 3, conventionally, motion estimation and compensation are performed after padding the values of pixels at a left border of a reference frame to the outside of the left border and pixels at a right border of the reference frame to the outside of the right border. In contrast, embodiments of the present invention take advantage of the fact that the spatial relation between the right and left borders of a panorama image with a 360° omni-directional view is very high. Referring to FIG. 9, according to an embodiment of the present invention, an outside region 480 of a left border region 450 of a reference frame 400 is padded with the values of pixels at a right border region 470 of the reference frame 400. An outside region 460 of the right border region 470 is padded with the values of pixels at the left border region 450.

Next, after padding the reference frame in operation 320, the panorama image motion estimating unit 160 fetches all the pixel values of the reference macro block from the padded reference frame in the frame memory 150 (325). Thereafter, the similarity between the current macro block X and the reference macro block is evaluated using a predetermined evaluation function (335). In general, a sum of absolute differences (SAD) function, a sum of absolute transformed differences (SATD) function, or a sum of squared differences (SSD) function is used as the predetermined evaluation function.

Figure 4A:
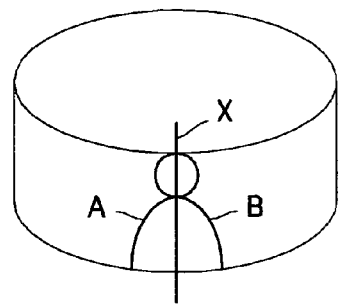
FIG. 4A is a diagram illustrating a cylindrical image with a 360° omni-directional view.

Alternatively, on an assumption that the reference frame is a cylindrical image obtained by connecting the right and left borders of the reference frame, it is possible to obtain the values of all of the pixels of a reference data unit from the cylindrical image without padding the reference frame. Specifically, the reference frame is a two-dimensional (2D) plane image such as that shown in FIG. 4B, and the cylindrical image such as that shown in FIG. 4A is obtained by connecting the right and left borders of the 2D plane image. That is, when the reference frame is a cylindrical image, the values of all of the pixel values of the reference data unit can be obtained from the cylindrical image.

Next, the panorama image motion estimating unit 160 changes the position of the reference macro block in a predetermined search range and determines the similarity between the changed reference macro block and the current macro block X (340 and 345). After the evaluation of the similarity between the current macro block X and each of a plurality of reference macro blocks in the predetermined search range, the panorama image motion estimating unit 160 determines a reference macro block that is the most similar to the current macro block X from the plurality of reference macro blocks, and generates a motion vector of the determined reference macro block (350).

Figure 10:
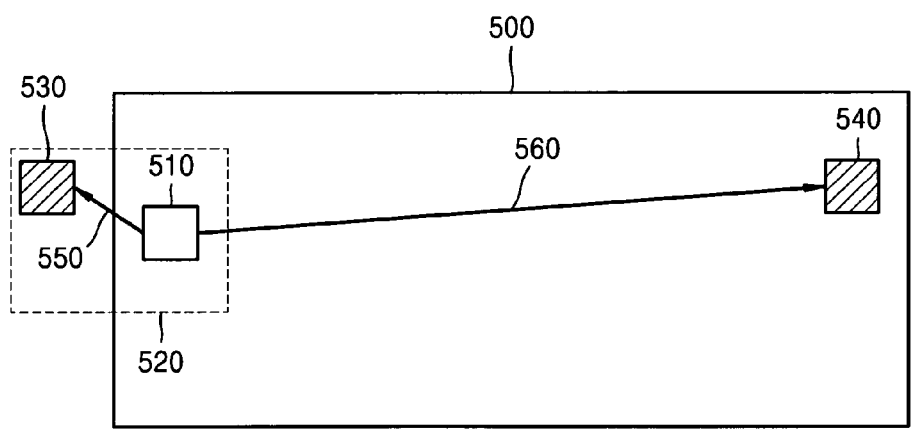
FIG. 10 is a diagram illustrating a motion vector of a current macro block.

FIG. 10 is a diagram illustrating a motion vector of a current macro block 510. In FIG. 10, reference numeral 530 denotes the macro block that is most similar to the current macro block 510 and present on the padded reference frame, and reference numeral 540 denotes the macro block that corresponds to the macro block 530 and is present on the non-padded image 500. When the macro block 530 is the most similar to the current macro block 510, reference numeral 550 denotes the motion vector of the current macro block 510. When the reference macro block 540 is the most similar to the current macro block 510, reference numeral 560 denotes the motion vector of the current macro block 510. That is, the motion vector of the current macro block 510 may be one of the motion vectors 550 and 560. However, since a motion vector of a macro block that does not fall within a predetermined search range cannot be transmitted to a decoder (not shown), the motion vector 550 of the reference macro block 530 is determined as the motion vector of the current macro block 510.

Figure 11A:
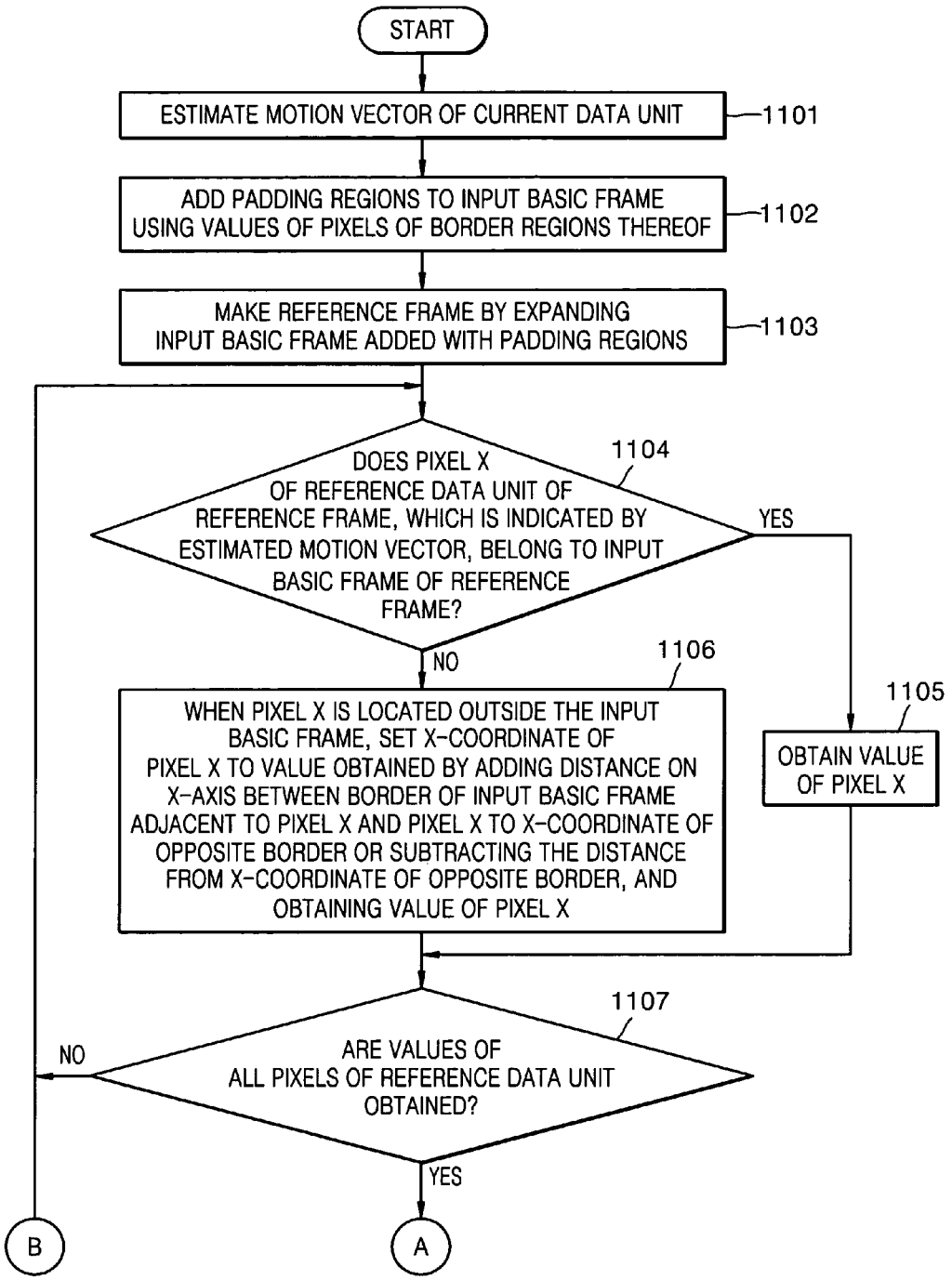
FIGS. 11A and 11B are a flowchart illustrating a method of detecting motion of a sub pixel according to an embodiment of the present invention.
Figure 11B:
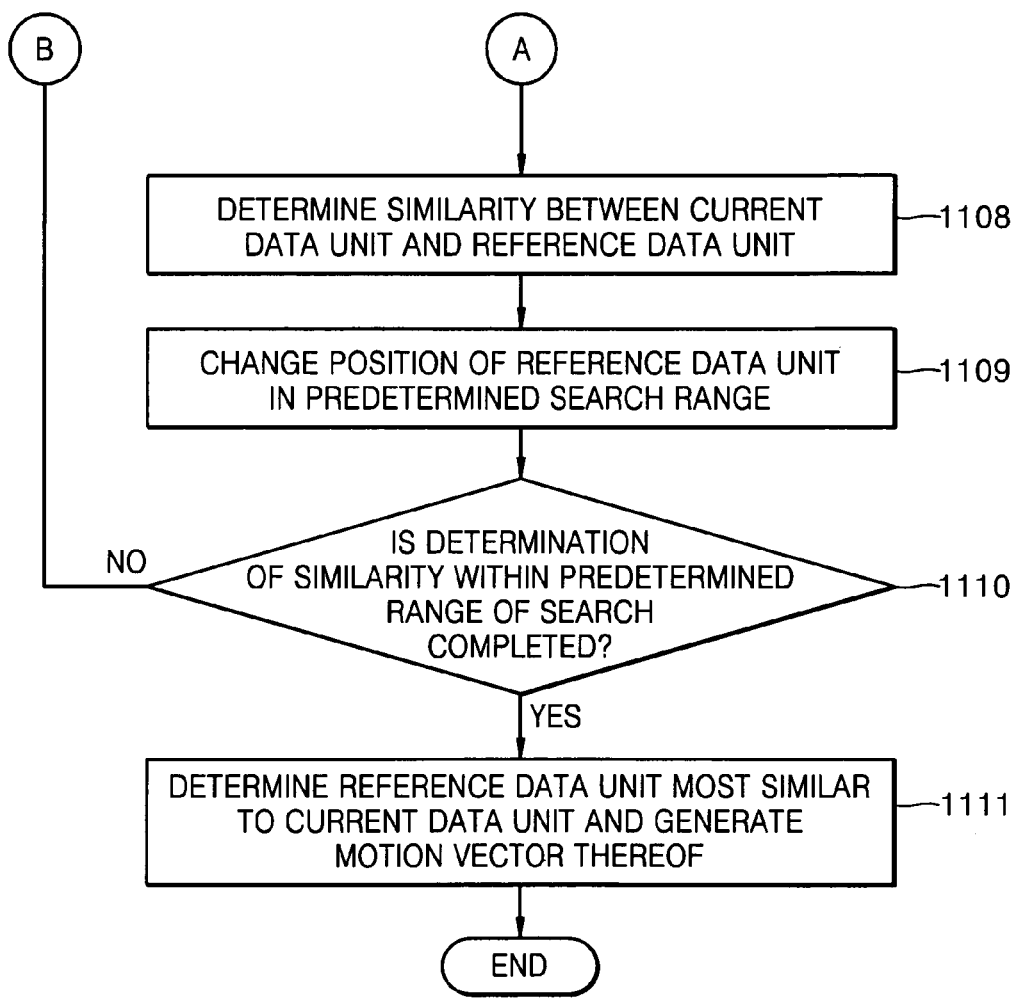

FIGS. 11A and 11B are a flowchart illustrating a method of estimating motion of a panorama image while searching for sub pixels according to an embodiment of the present invention. Referring to FIGS. 11A and 11B, the panorama image motion estimating unit 160 of FIG. 5 estimates a motion vector of a current data unit, using motion vectors of a plurality of previous data units adjacent to the current data unit (1101). The estimation of the motion vector is performed similar to motion estimation of a panorama image while searching for pixels.

Next, the panorama image motion estimating unit 160 adds padding regions to an input basic frame, which will be used as a basic reference frame for motion estimation of a current panorama image, using the values of pixels present in border regions of the basic frame (1102). That is, the values of pixels of a left border region of the basic frame are padded to a padding region connected to the left side of the basic frame, and the values of pixels of a right border region of the basic frame are padded to a padding region connected to the right side of the basic frame.

Next, the panorama image motion estimating unit 160 generates a reference frame by expanding the basic frame to which the padding regions are added in operation 1102 (1103). For instance, in the case of a half pixel search, the basic frame is expanded two times, and in the case of a quarter pixel search, the basic frame is expanded four times.

Figure 12:
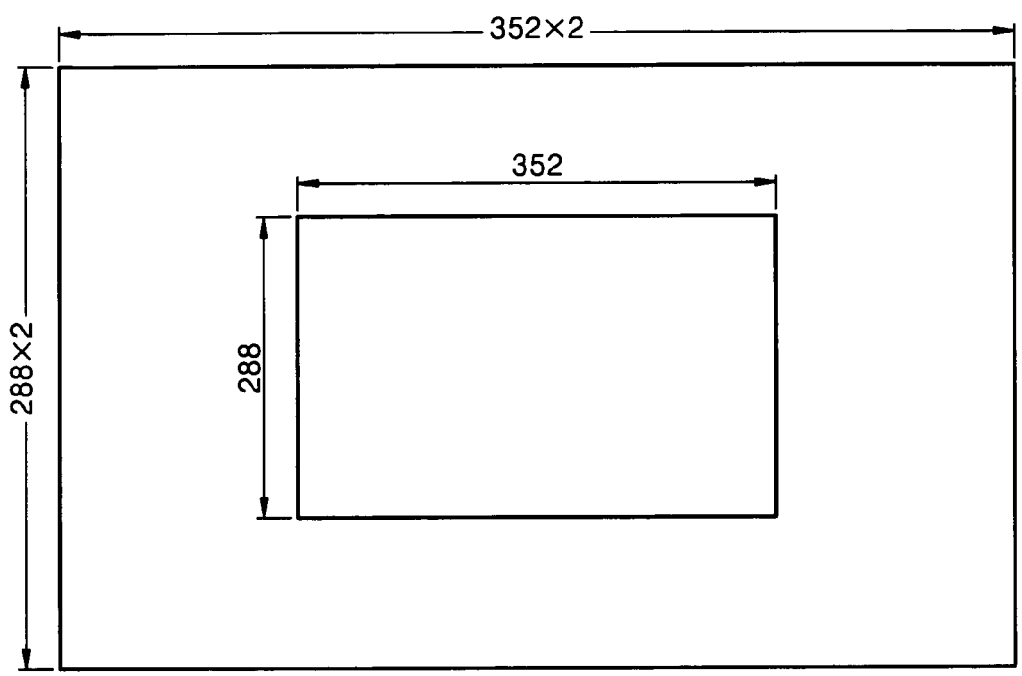
FIG. 12 illustrates an example of an input basic frame, explaining the method of FIG. 11.
Figure 13A:
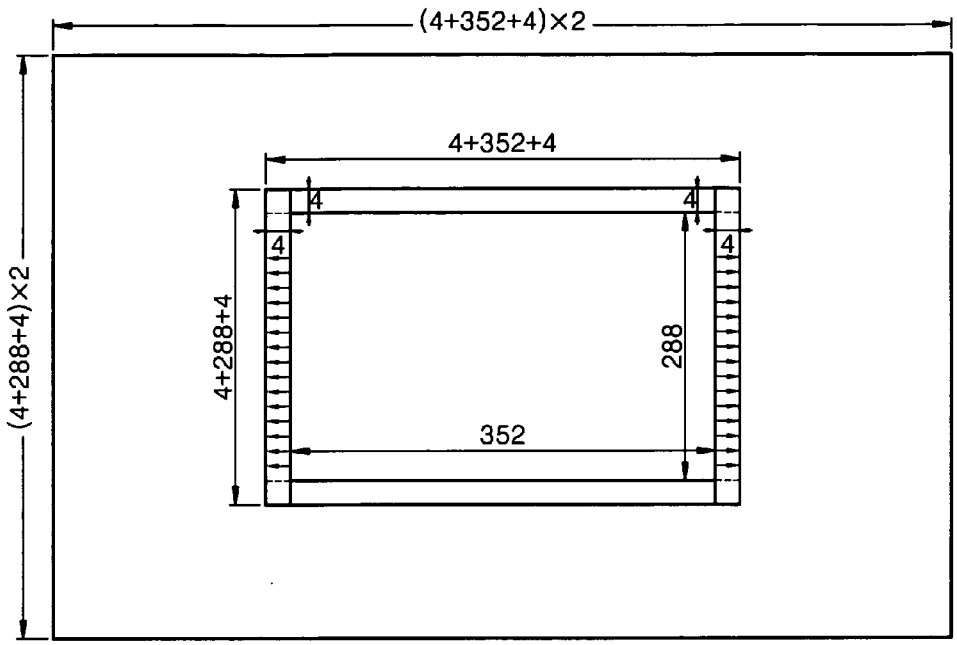
FIG. 13A shows a reference frame obtained by adding padding regions to the basic frame of FIG. 12 and expanding the basic frame added with the padding regions two times, explaining the method of FIGS. 11A and 11B, according to an embodiment of the present invention.

For instance, when the current panorama image is 352×288 and detection of half pixels is performed thereon, the current panorama image is doubled to (352×2)×(288×2), as illustrated in FIG. 12. Referring to FIG. 13A, to obtain a reference frame, when padding regions, each having a padding size of 4, are padded to the basic frame of 352×288 for reference, the padded basic frame has a size of (4+352+4)×(4+288+4) and is then doubled to ((4+352+4)×2)×((4+288+4)×2).

After estimating the motion vector of the current data unit, the panorama image motion estimating unit 160 determines whether a pixel X of a reference data unit indicated by the estimated motion vector belongs to the basic frame of the reference frame (1104).

Next, if the pixel X belongs to the basic frame, the value of the pixel X is obtained as it is (1105).

If the pixel X belongs to a padding region of or outside the reference frame, that is, it is located outside the basic frame, an x-coordinate of the pixel X is set to a value obtained by adding the distance on an x-axis between a border of the basic frame adjacent to the pixel X and the pixel X to an x-coordinate of the opposite border or subtracting the distance from the x-coordinate of the opposite border, and then, the value of the corresponding pixel with the set x-coordinate is obtained (1106). For instance, when the pixel X belongs to a padding region connected to the left side of the basic frame or a region outside the left side of the reference frame, the x-coordinate of the pixel X is set to a value obtained by subtracting the distance on the x-axis between the a border of the basic frame closest to the pixel X and the pixel X from the x-coordinate of the opposite border. If the pixel X belongs to a padding region connected to the right side of the basic frame or outside the right side of the reference frame, the x-coordinate of the pixel X is set to a value obtained by adding the distance on the x-axis between the border of the basic frame closest to the pixel X and the pixel X to the x-coordinate of the opposite border.

Figure 13B:
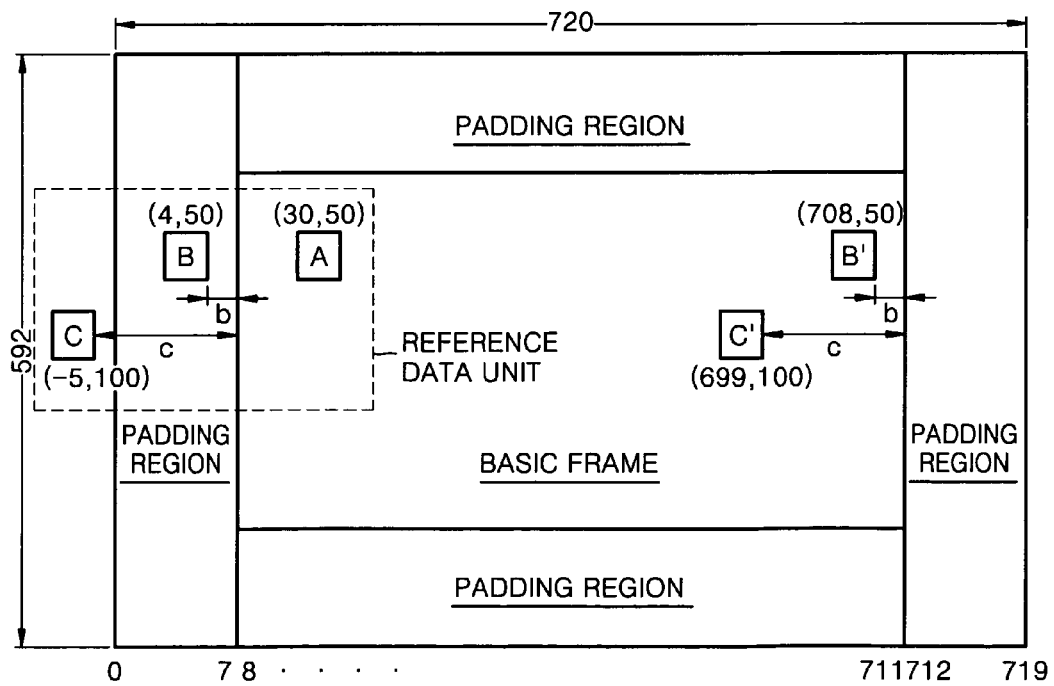
FIG. 13B shows a reference diagram illustrating processing of the values of pixels of a padding region of a reference frame, according to the method of FIGS. 11A and 11B.

For instance, referring to FIG. 13B, since the coordinates of a pixel A in the reference data unit are (30, 50), that is, they belong to the basic frame, the value of the pixel A is used as it is.

A pixel B in the reference data unit has coordinates (4,50) and thus belongs to the padding region connected to the left side of the basic frame. The x-coordinate of a border of the basic frame adjacent to the pixel B is 7, and the distance between the pixel B and the border is 3. Since the x-coordinate of the opposite border is 711 and 711−3=708, the x-coordinate of the pixel B is set to 708. That is, the value of the pixel B is obtained from the coordinates (708,50) of a pixel B'.

A pixel C in the reference data unit has coordinates (−5, 100), that is, it is positioned outside the reference frame. The x-coordinate of a border of the basic frame adjacent to the pixel C is 7, and the distance between the pixel C and the border is 12. Since the x-coordinate of the opposite border is 711 and 711−12=699, the x-coordinate of the pixel C is set to 699. That is, the value of the pixel C is obtained from the coordinates (699,100) of a pixel C'.

As described above, in the present embodiment, the value of a pixel present in the padding region is set to the value of the corresponding pixel in the opposite border region, since the value of the pixel present in the padding region is an insignificant value. That is, in case that the padding region is filled with insignificant values, the value of a pixel preset in the padding region or outside a reference frame is obtained from that of the corresponding pixel at the opposite border.

Next, the panorama image motion estimating unit 160 determines whether the values of all pixels in the reference data unit are obtained (1107). If the values of all the pixels in the reference data unit are obtained, the similarity between the current data unit and the reference data unit is determined using a predetermined evaluation function (1108). If not, the method returns to operation 1104 to obtain the values of all the pixels in the reference data unit. In general, a sum of absolute differences (SAD) function, a sum of absolute transformed differences (SATD) function, or a sum of squared differences (SSD) function is used as the predetermined evaluation function.

Next, the panorama image motion estimating unit 160 changes the location of the reference data unit within a predetermined range of detection, and determines the similarity between the current data unit and the changed reference data unit (1109). Next, after determining the similarity between the current data unit and each of a plurality of reference data unit within the predetermined range of detection (1110), the panorama image motion estimating unit 160 selects a reference data unit most similar to the current data unit from among the plurality of the reference data units, and generates a motion vector representing the selected reference data unit (1111).

Figure 14B:
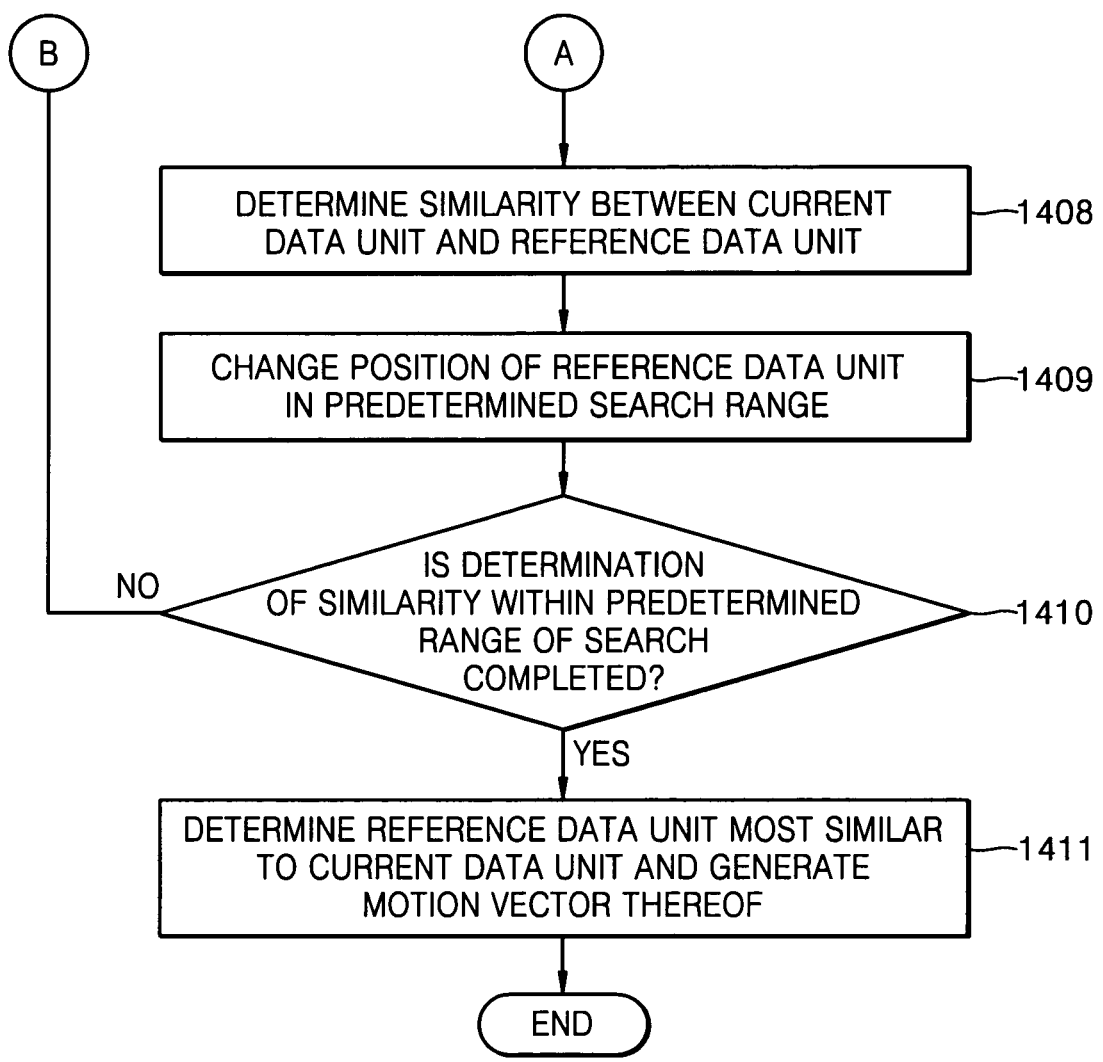

FIGS. 14A and 14B are a flowchart illustrating a method of estimating motion of a panorama image while searching for sub pixels according to another embodiment of the present invention. Referring to FIGS. 14A and 14B, the panorama image motion estimating unit 160 estimates a motion vector of a current data unit using motion vectors of a plurality of previous data units adjacent to the current data unit (1401). The estimation of the motion vector is performed similar to motion estimation of a panorama image while detecting pixels.

The panorama image motion estimating unit 160 pads a padding region connected to the left side of a basic frame using the values of pixels present in a right border region thereof, and a padding region connected to the right side of the basic frame using the values of pixels present in a left border region thereof (1402).

Next, the panorama image motion estimating unit 160 makes a reference frame by expanding the basic frame to which the padding regions are added in operation 1402 (1403). For instance, a half pixel is expanded two times, and a quarter pixel is expanded four times.

Figure 15A:
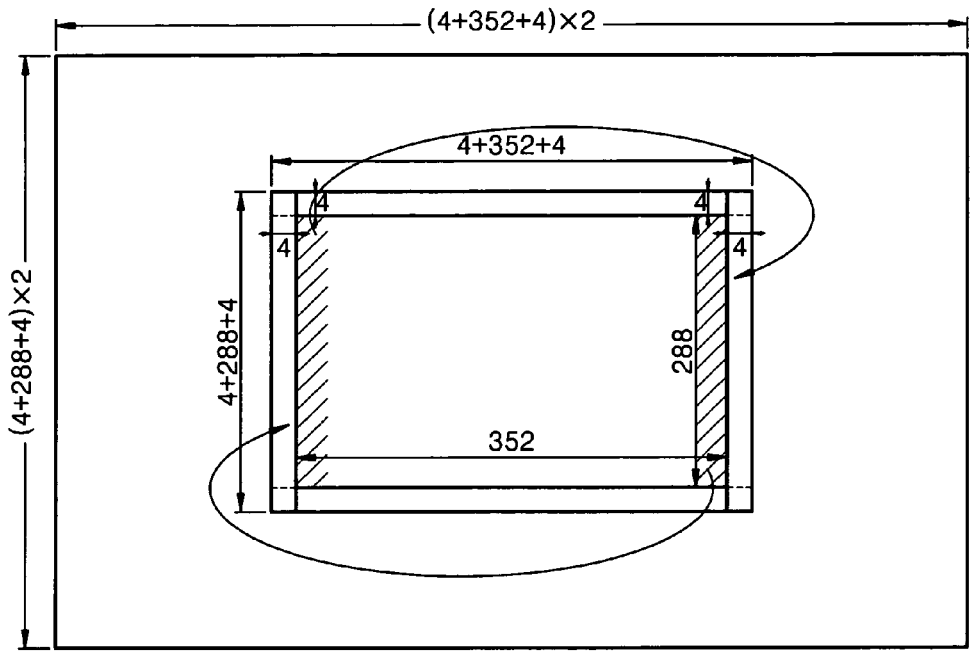
FIG. 15A illustrates a reference frame obtained by adding padding regions to the basic frame of FIG. 12 and expanding the basic frame added with the padding regions two times, explaining the method of FIGS. 14A and 14B.

For instance, when a current panorama image is 352×288 and detection of half pixels is performed thereon, the current panorama image is doubled to (352×2)×(288×2) as illustrated in FIG. 12. Referring to FIG. 15A, in order to obtain a reference frame, when padding regions, each having a padding size of 4, are padded to an input basic frame of 352×288 for reference, the padded basic frame has a size of (4+352+4)× (4+288+4) and is then doubled to ((4+352+4)×2)×((4+288+ 4)×2). Of course, a padding region added to the left side of the basic frame is padded with the values of pixels in a right border region of the basic frame, and a padding region added to the right side thereof is padded with the values of pixels in a left border region of the basic frame.

Next, the panorama image motion estimating unit 160 estimates a motion vector of the current data unit and determines whether a pixel B of a reference data unit indicated by the estimated motion vector belongs to the reference frame (1404).

If a pixel X of the reference data unit belongs to the reference frame, the value of the pixel X is used as it is (1405).

When the pixel X is located outside the reference frame, the x-coordinate of the pixel X is set to a value obtained by adding the distance on an x-axis between the pixel X and a border of the basic frame adjacent to the pixel X to the x-coordinate of the opposite border, and then, the value of the corresponding pixel with the set x-coordinate is obtained (1406). That is, when the pixel X is located outside the left side of the reference frame, the x-coordinate of the pixel X is set to a value obtained by subtracting the distance on the x-axis between a border of the basic frame adjacent to the pixel X and the pixel X from the x-coordinate of the opposite border. When the pixel X is located outside the right side of the reference frame, the x-coordinate of the pixel X is set to a value obtained by adding the distance on the x-axis between a border of the basic frame adjacent to the pixel X and the pixel X.

Figure 15B:
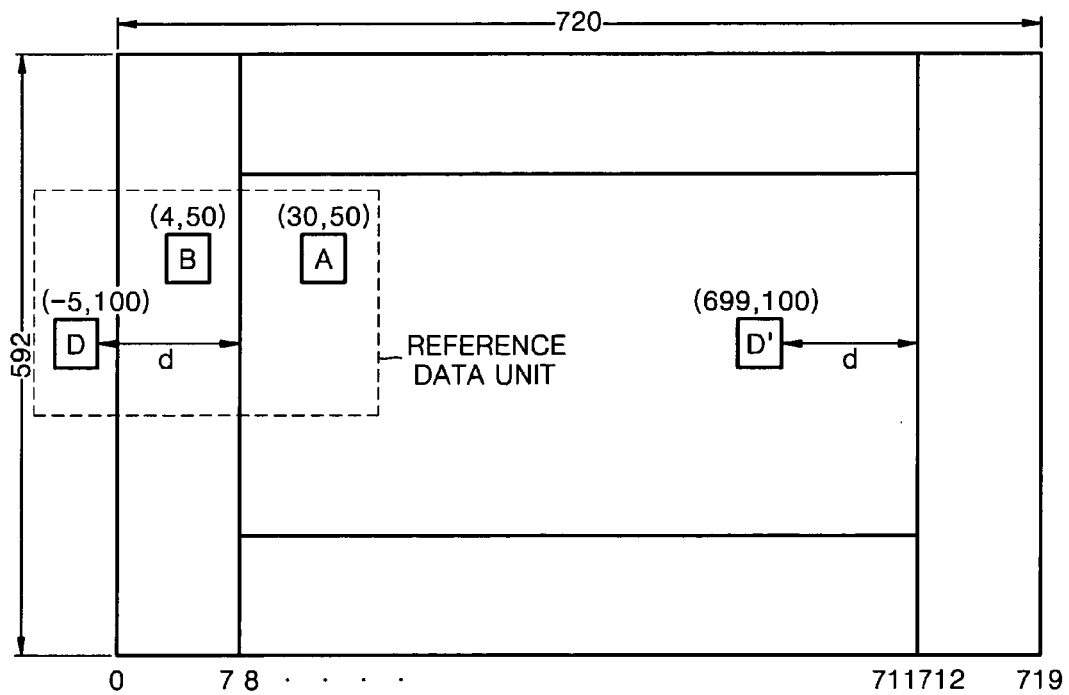
FIG. 15B is a reference diagram illustrating processing of the values of pixels in a padding region of and outside a reference frame, according to the method of FIGS. 14A and 14B.

For instance, referring to FIG. 15B, a pixel A with coordinates (30,50), a pixel B with coordinates (4,50), and a pixel D with coordinates (−5,100) are present in a reference data unit.

The pixels A and B belong to the reference frame, and the pixel D is located outside the reference frame. Also, the pixel A is present in the basic frame of the reference frame, and the pixel B is present in a padding region. Since the pixel A is present in the basic frame, the value of the pixel A is used as it is.

The pixel B is present in a padding region that has been padded with the values of pixels in a right border region of the basic frame in consideration of the spatial characteristics of the panorama image when making the reference frame. Therefore, the value of the pixel B is also used as it is.

The coordinates of the pixel D in the reference data unit are (−5,100), that is, the pixel D is located outside the reference frame. The x-coordinate of a border of the basic frame adjacent to the pixel D is 7, and the distance between the pixel D and the border is 12. Since the x-coordinate of the opposite border is 711 and 711−12=699, the x-coordinate of the pixel D is set to 699. That is, the value of the pixel D is obtained from the coordinates (699,100) of a pixel D'. As described above, in the present embodiment, the values of pixels present in each padding region are used as they are, since each padding region has already been padded with the values of pixels in the opposite border region. Thus, the values of only pixels outside the reference frame are obtained from those of their corresponding pixels in the opposite border region.

Next, the panorama image motion estimating unit 160 determines whether the values of all pixels in the reference data unit are obtained (1407). If the values of all the pixels in the reference data unit are obtained, the similarity between the current data unit and the reference data unit is determined using a predetermined evaluation function (1408). If not, the method returns to operation 1404 so as to obtain the values of the other pixels in the reference data unit. In general, the sum of absolute differences (SAD) function, the sum of absolute transformed differences (SATD) function, or the sum of squared differences (SSD) function is used as the predetermined evaluation function.

Next, the panorama image motion estimating unit 160 changes the location of the reference data unit within a predetermined range of detection and determines the similarity between the changed reference data unit and the current data unit (1409 and 1410). After determining the similarity between each of a plurality of reference data units and the current data unit, the panorama image motion estimating unit 160 selects a reference data unit the most similar to the current data unit from among the plurality of the reference data units within the predetermined range of detection, and generates a motion vector representing the selected reference data unit (1411).

A method and apparatus for compensating for the motion of a panorama image according to an embodiment of the present invention will now be described.

Figure 16:
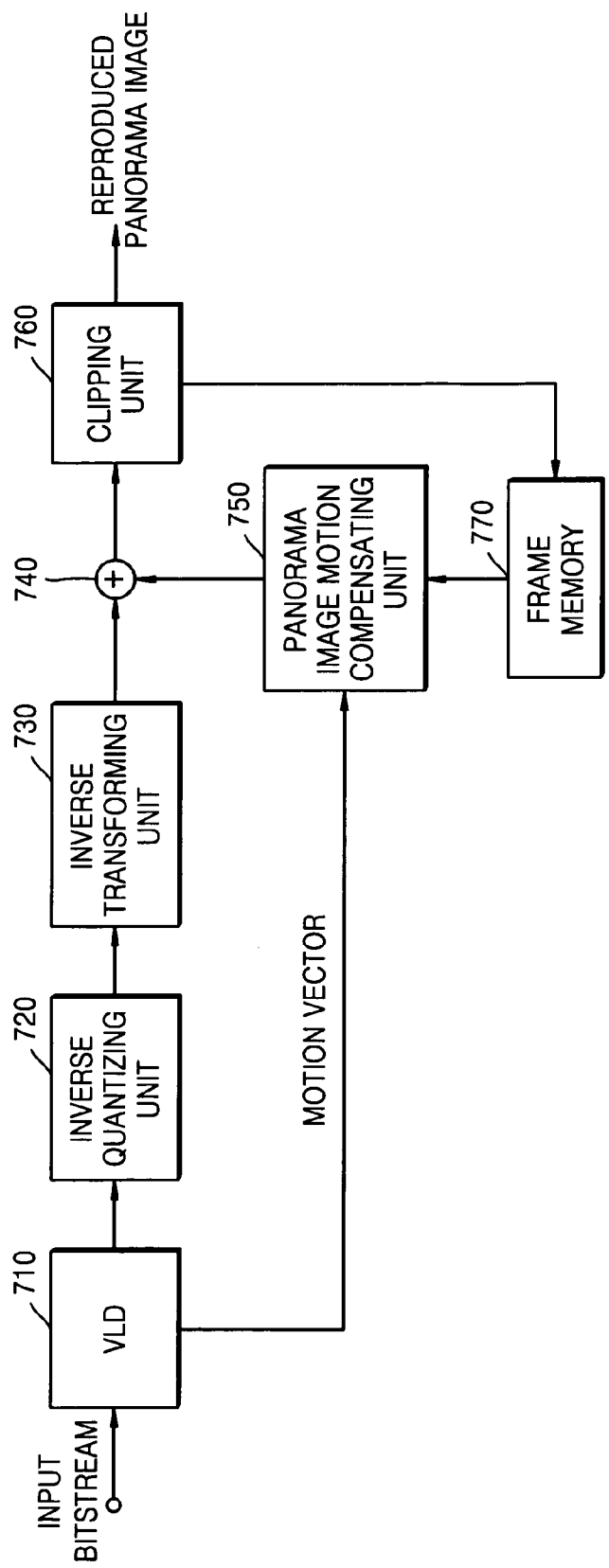
FIG. 16 is a block diagram of a decoding unit that decodes a motion vector of a panorama image according to an embodiment of the present invention.

FIG. 16 is a block diagram of a decoding unit that decodes a motion vector of a panorama image according to an embodiment of the present invention. Referring to FIG. 16, the decoder includes a variable-length decoder (VLD) 710, an inverse quantizing unit 720, an inverse transforming unit 730, an adding unit 740, a panorama image motion compensating unit 750, a clipping unit 760, and a frame memory 770.

The VLD 710 variable-length decoder decodes an input bitstream. A motion vector, and a residual signal between a macro block and a reference macro block output from the VOD 710 are input to the panorama image motion compensating unit 750 and the inverse quantizing unit 720, respectively.

The frame memory 770 stores a reference panorama image obtained by sequentially inputting the input bitstream to the inverse quantizing unit 720, the inverse transforming unit 730, and the clipping unit 760. The reference panorama image stored in the frame memory 770 is used for compensation for the motion of a newly input panorama image.

The panorama image motion compensating unit 750 performs motion compensation according to an embodiment of the present invention, using the reference panorama image stored in the frame memory 770. In detail, the panorama image motion compensating unit 750 receives a motion vector of the current macro block from an encoder such as that shown in FIG. 5, reads a reference macro block corresponding to the current macro block in the frame memory 770, and outputs the read reference macro block to the adding unit 740. Then, the adding unit 740 receives the residual signal between the current macro block and the reference macro block that are inversely quantized by the inverse quantizing unit 720 and inversely transformed by the inverse transforming 730.

The adding unit 740 reproduces the current macro block using the residual signal between the current macro block and the reference macro block, and a reference macro block input from the panorama image motion compensating unit 750. The clipping unit 760 normalizes the reproduced current macro block output from the adding unit 740.

Figure 17:
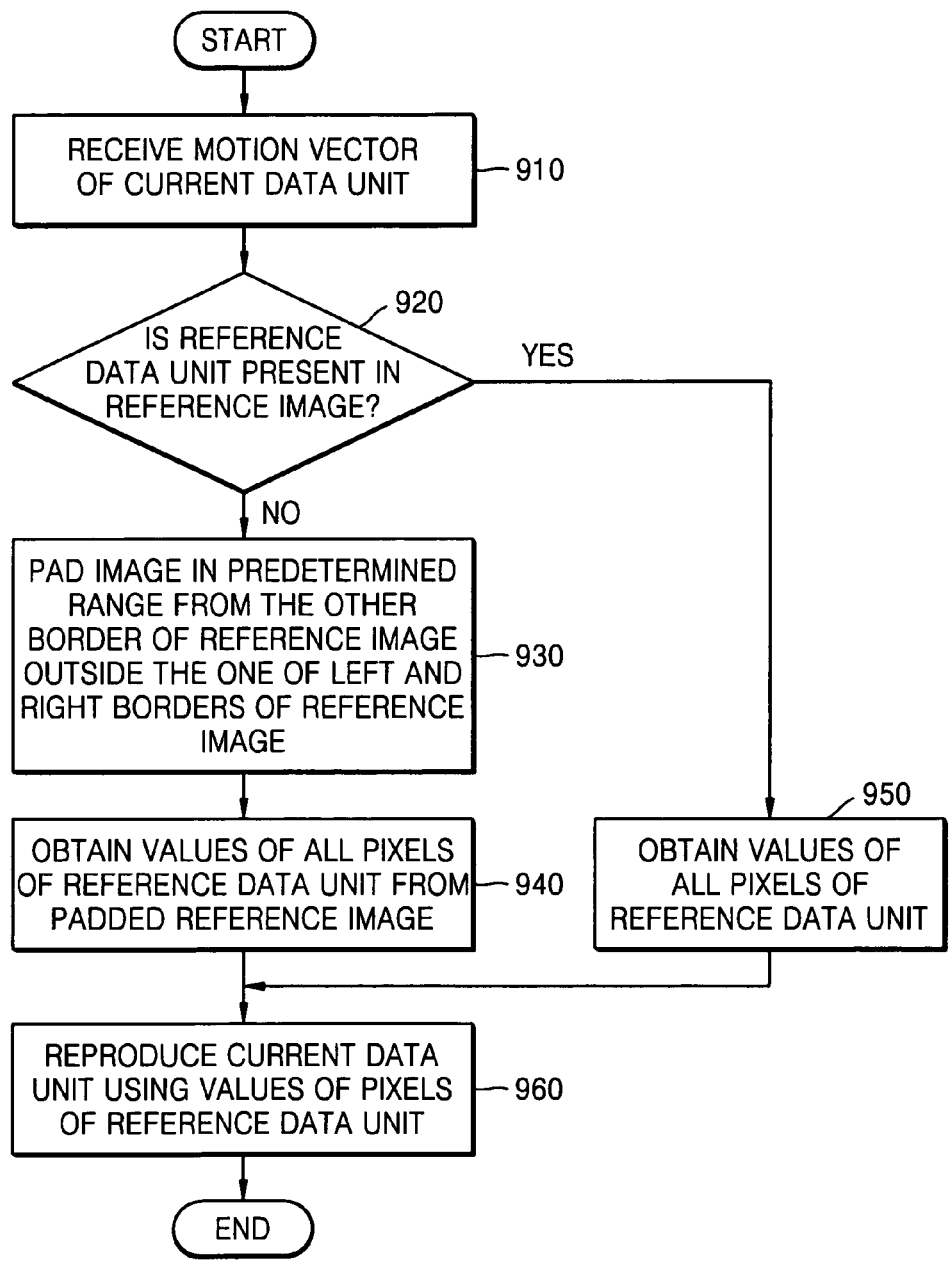
FIG. 17 is a flowchart of a method of compensating for the motion of a panorama image according to an embodiment of the present invention.

The operation of the panorama image motion compensating unit 750 will now be described in greater detail. FIG. 17 is a flowchart illustrating a method of compensating for the motion of a panorama image according to an embodiment of the present invention.

Referring to FIG. 17, the panorama image motion compensating unit 750 receives a motion vector of a current data unit on which motion estimation is to be performed from the VLD 710 (910). In this embodiment, data units are 16×16 macro blocks.

Next, the panorama image motion compensating unit 750 determines whether a reference macro block indicated by the motion vector of the current macro block is present in a reference frame (920). The reference frame is stored in the frame memory 770.

In case of searching for integer pixels, when pixels of the reference macro block indicated by the motion vector of the current macro block are present in the reference frame, the values of all the pixels of the reference macro block are read from the frame memory 770 (950), and the current macro block is reproduced (960).

The adding unit 740 reproduces the current macro block, using the residual signal between the current macro block and the reference macro block output from the inversely transforming unit 730 and the reference macro block output from the panorama image motion compensating unit 750.

However, as illustrated in FIG. 8A or 8B, when some or all the pixels of the reference macro block indicated by the motion vector of the current macro block are positioned outside one of left and right borders of the reference frame, an image in a predetermined range from the other border of the reference frame is padded outside the one of the left and right borders (930). According to an embodiment of the present invention, as illustrated in FIG. 9, regions outside of the reference frame are padded based on that the spatial relation between right and left borders of a panorama image with a 360° omni-directional view is very high.

Next, after padding the reference frame in operation 930, the panorama image motion compensating unit 750 reads the values of all pixels of the reference macro block from the padded reference frame from the frame memory 770 (940).

Figure 4B:
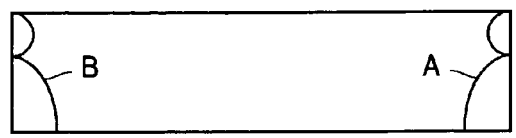
FIG. 4B is a diagram illustrating a two-dimensional (2D) image corresponding to the cylindrical image of FIG. 4A.

Alternatively, on the assumption that the reference frame is a cylindrical image obtained by connecting the left and right borders of the reference frame, it is possible to obtain the values of all the pixels of the reference data unit from the cylindrical image without padding the reference frame. More specifically, the reference frame is a 2D plane image such as that shown in FIG. 4B, and the cylindrical image such as that shown in FIG. 4B is obtained by connecting the left and right borders of the 2D plane image. That is, if the reference frame is the cylindrical image, the values of all the pixels of the reference data unit can be obtained from the cylindrical image.

Lastly, the adding unit 740 reproduces the current macro block, using the residual signal between the current macro block and the reference macro block and the reference macro block input from the panorama image motion compensating unit 750 (960).

In case of searching for sub pixels, according to an embodiment of the present invention, a padding region connected to the left side of a basic frame to be used for motion compensation of a current panorama image is padded using a right border region of the basic frame, and a padding region connected to the right side of the basic frame is padded using a left border region of the basic frame. A reference frame obtained by expanding the padded basic frame is stored in a frame memory. When a sub pixel whose motion is to be searched for and that is present in a reference data unit indicated by an input motion vector, belongs to the reference frame, the value of the sub pixel is applied to motion estimation as it is. The x-coordinate of the sub pixel is set to a value obtained by adding the distance on an x-axis between a border of the basic frame adjacent to the sub pixel and the sub pixel to the x-coordinate of the opposite border or subtracting the distance from the x-coordinate of the opposite border, and the value of the sub pixel is obtained from that of the corresponding pixel in the opposite border region.

In case of searching for sub pixels, according to another embodiment of the present invention, a padding region connected to the left side of a basic frame to be used for motion compensation of a current panorama image is padded using the values of pixels in a left border region of the basic frame, and a padding region connected to the right side of the basic frame is padded using the values of pixels in a right border region of the basic frame. A reference frame obtained by expanding the padded basic frame is stored in a frame memory. When a sub pixel whose motion is to be detected and that is present in a reference data unit indicated by a motion vector of a current data unit, belongs to the basic frame, the value of the sub pixel is used as it is. When the sub pixel is located outside the basic frame, the x-coordinate of the sub pixel is set to a value obtained by adding the distance on an x-axis between a border of the basic frame adjacent to the sub pixel and the basic frame to the x-coordinate of the opposite border or subtracting the distance from the x-coordinate of the opposite border, and the value of the sub pixel is obtained from that of the corresponding pixel in the opposite border region.

In this disclosure, motion compensation for a panorama image is performed in the width direction of a reference frame, such that the values of pixels of a left border region of a basic frame are used as those of pixels of a padding region connected to the right side thereof, and vice versa. That is, motion compensation is performed in the width direction of the reference frame since the spatial relation between the right and left borders of the panorama image is high. However, it would be obvious to those of ordinary skill in the art that when the spatial relation between upper and lower border regions of the panorama image is also high, the present invention is applicable to the reference frame in the height direction thereof.

The present invention may be embodied as computer readable code in a computer readable medium. Here, the computer readable medium may be any recording apparatus capable of storing data that is read by a computer system, such as a read-only memory (ROM), a random access memory (RAM), a compact disc (CD)-ROM, a magnetic tape, a floppy disk, an optical data storage device, and so on. Also the computer readable medium may be a carrier wave that transmits data via the Internet, for example. The computer readable medium can be distributed among computer systems that are interconnected through a network, and the present invention may be stored and implemented as a computer readable code in the distributed system.

As described above, according to the present invention, motion estimation and compensation are performed on a panorama image with a 360° omni-directional view based on that the spatial relation between right and left borders of the panorama image is very high, thereby increasing the efficiency and precision of motion estimation and compensation. Accordingly, it is possible to improve image quality, in particular, the image quality at the right and left borders of the panorama image.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of estimating a motion of a panorama image containing 360° omni-directional view information, the method comprising the following steps:

padding a padding region connected to the outer left side of the left border of a basic reference frame to be used for motion estimation of the panorama image, using corresponding pixel values of a right border region of the basic reference frame, padding a padding region connected to the outer right side of the right border of the basic reference frame using corresponding pixel values of a left border region thereof, and making a reference frame by expanding the basic reference frame including the padded regions, wherein the right border region is the region inside and adjacent the right border of the basic reference frame and the left border region is the region inside and adjacent the left border of the basic reference frame;

estimating a motion vector of a current data unit of the panorama image, using motion vectors of a plurality of previous data units adjacent to the current data unit;

determining values of all pixels of a reference data unit indicated by the estimated motion vector from the reference frame by obtaining a set value of a sub pixel when the sub pixel belongs to the reference frame, and obtaining a value of a corresponding sub pixel with an x-coordinate determined by setting an x-coordinate of the sub pixel to a value obtained by adding a distance on an x-axis between a border of the basic reference frame adjacent to the sub pixel and the sub pixel to an x-coordinate of an opposite border of the basic reference frame, when the sub pixel is located outside the left border of the reference frame, and subtracting the distance from the x-coordinate of the opposite border when the sub pixel is located outside the right border of the reference frame; and determining a similarity between the current data unit and the reference data unit using a predetermined evaluation function;

wherein the padding, estimating, and determining steps are carried out by a processor.

2. The method of claim 1, wherein when at least one of the plurality of the previous data units is present outside one of the left and right borders of the panorama image, the estimation of the motion vector of the current data unit comprises determining the plurality of the previous data units from a cylindrical image which is obtained by connecting the left and right borders of the panorama image.

3. The method of claim 1, further comprising:
determining a reference data unit which is the most similar to the current data unit in a predetermined search range; and
determining a motion vector representing the determined reference data unit.

4. A method of estimating a motion of a panorama image containing 360° omni-directional view information, the method comprising the following steps:
padding a padding region connected to the outer left side of the left border of a basic reference frame to be used for motion estimation of the panorama image, using values of pixels of a left border region of the basic reference frame, padding a padding region connected to the outer right side of the right border of the basic reference frame using values of pixels of a right border region thereof, and making a reference frame by expanding the basic reference frame including the padded regions, wherein the right border region is the region inside and adjacent the right border of the basic reference frame and the left border region is the region inside and adjacent the left border of the basic reference frame;
estimating a motion vector of a current data unit of the panorama image, using motion vectors of a plurality of previous data units adjacent to the current data unit;
determining values of all pixels of a reference data unit indicated by the estimated motion vector from a reference frame by obtaining a set value of a sub pixel when the sub pixel belongs to the basic reference frame, and obtaining a value of a corresponding sub pixel with an x-coordinate determined by setting an x-coordinate of the sub pixel to a value obtained by adding a distance on an x-axis between a border of the basic reference frame adjacent to the sub pixel and the sub pixel to an x-coordinate of an opposite border of the basic reference frame, when the sub pixel is located outside the left border of the basic reference frame, and subtracting the distance from the x-coordinate of the opposite border when the sub pixel is located outside the right border of the basic reference frame; and
determining a similarity between the current data unit and the reference data unit using a predetermined evaluation function;
wherein the padding, estimating, and determining steps are carried out by a processor.

5. The method of claim 4, wherein when at least one of the plurality of the previous data units is present outside one of the left and right borders of the panorama image, the estimation of the motion vector of the current data unit comprises determining the plurality of the previous data units from a cylindrical image which is obtained by connecting the left and right borders of the panorama image.

6. The method of claim 4, further comprising:
determining a reference data unit which is the most similar to the current data unit in a predetermined search range; and
determining a motion vector representation of the determined reference data unit.

7. An apparatus for estimating a motion of a panorama image containing 360° omni-directional view information, the apparatus comprising:
a memory for storing a reference frame and motion vectors of a plurality of previous data units adjacent to a current data unit of the panorama image, the reference frame being obtained by padding a padding region connected to the outer left side of the left border of a basic reference frame to be used for motion estimation of the panorama image, using corresponding pixel values of a right border region of the basic reference frame, padding a padding region connected to the outer right side of the right border of the basic reference frame using corresponding pixel values of a left border region thereof, and making a reference frame by expanding the basic reference frame including the padded regions, wherein the right border region is the region inside and adjacent the right border of the basic reference frame and the left border region is the region inside and adjacent the left border of the basic reference frame; and
a motion estimating unit for estimating a motion vector of the current data unit using the motion vectors of the previous data units; determining values of all pixels of the reference data unit indicated by the estimated motion vector from the reference frame by obtaining a set value of the sub pixel when a sub pixel indicated by the estimated motion vector belongs to the reference frame, obtaining a value of a corresponding sub pixel with an x-coordinate determined by setting an x-coordinate of the sub pixel to a value obtained by adding a distance on an x-axis between a border adjacent the basic reference frame adjacent to the sub pixel and the sub pixel to an x-coordinate of an opposite border of the basic reference frame, when the sub pixel is located outside the left border of the reference frame, and subtracting the distance from the x-coordinate of the opposite border when the sub pixel is located outside the right border of the reference frame, and determining a similarity between the current data unit and the reference data unit using a predetermined evaluation function, wherein the motion estimating unit is controlled by a processor.

8. The apparatus of claim 7, wherein the motion estimating unit determines a reference data unit which is the most similar to the current data unit in a predetermined search range, and determines a motion vector representing the determined reference data unit.

9. An apparatus for estimating a motion of a panorama image containing 360° omni-directional view information, the apparatus comprising:
a memory for storing a reference frame and motion vectors of a plurality of previous data units adjacent to a current data unit of the panorama image, the reference frame being obtained by padding a padding region connected to the outer left side of the left border of a basic reference frame to be used for motion estimation of the panorama images using values of pixels of a left border region of the basic reference frame, padding a padding region connected to the outer right side of the right border of the basic reference frame using values of pixels of a right border region thereof, and making a reference frame by expanding the basic reference frame including the padded regions, wherein the right border region is the region inside and adjacent the right border of the basic reference frame and the left border region is the region inside and adjacent the left border of the basic reference frame; and a motion estimating unit for estimating a motion vector of the current data unit using the motion vectors of the previous data units; determining values of all pixels of the reference data unit indicated by the estimated motion vector from the reference frame by obtaining a set value of the sub pixel when a sub pixel indicated by the estimated motion vector belongs to the basic reference frame of the reference frame, obtaining a value of a corresponding sub pixel with an x-coordinate determined by setting an x-coordinate of the sub pixel to a value obtained by adding a distance on an x-axis between a border adjacent the basic reference frame adjacent to the sub pixel and the sub pixel to an x-coordinate of an opposite border of the basic reference frame, when the sub pixel is located outside the left border of the basic reference frame, and subtracting the distance from the x-coordinate of the opposite border when the sub pixel is located outside the right border of the basic reference frame, and determining a similarity between the current data unit and the reference data unit using a predetermined evaluation function, wherein the motion estimating unit is controlled by a processor.

10. The apparatus of claim 9, wherein when at least one of the plurality of the previous data units is present outside one of the left and right borders of the panorama image, the motion estimating unit determines the plurality of the previous data units from a cylindrical image obtained by connecting the left and right borders of the panorama image.

11. The apparatus of claim 9, wherein the motion estimating unit determines a reference data unit which is the most similar to the current data unit in a predetermined search range, and determines a motion vector representing the determined reference data unit.

12. A method of compensating for a motion of a panorama image containing 360° omni-directional view information, the method comprising the following steps:

padding a padding region connected to the outer left side of the left border of a basic reference frame to be used for motion compensation for the panorama image, using corresponding pixel values of a right border region of the basic reference frame, padding a padding region connected to the outer right side of the right border of the basic reference frame using corresponding pixel values of a left border region thereof, and making a reference frame by expanding the basic reference frame including the padded regions, wherein the right border region is the region inside and adjacent the right border of the basic reference frame and the left border region is the region inside and adjacent the left border of the basic reference frame;

receiving a motion vector of a current data unit of the panorama image;

determining values of all pixels of the reference data unit indicated by the estimated motion vector from the reference frame by obtaining a set value of a sub pixel of a reference data unit indicated by the motion vector of the current data unit when the sub pixel of belongs to the reference frame, and obtaining a value of a corresponding sub pixel with an x-coordinate determined by setting an x-coordinate of the sub pixel to a value obtained by adding a distance on an x-axis between a border of the basic reference frame adjacent to the sub pixel and the sub pixel to an x-coordinate of an opposite border of the basic reference frame, when the sub pixel is located outside the left border of the reference frame, and subtracting the distance from the x-coordinate of the opposite border when the sub pixel is located outside the right border of the reference frame, and reproducing the current data unit using the values of the pixels of the reference data unit;

wherein the padding, receiving, determining, and reproducing steps are carried out by a processor.

13. A method of compensating for a motion of a panorama image containing 360° omni-directional view information, the method comprising the following steps:

padding a padding region connected to the outer left side of the left border of a basic reference frame to be used for motion compensation for the panorama image, using values of pixels of a left border region, padding a padding region connected to the outer right side of the right border of the basic reference frame using values of pixels of a right border region thereof, and making a reference frame by expanding the basic reference frame including the padded regions, wherein the right border region is the region inside and adjacent the right border of the basic reference frame and the left border region is the region inside and adjacent the left border of the basic reference frame;

receiving a motion vector of a current data unit of the panorama image;

determining values of all pixels of a reference data unit indicated by the received motion vector from the reference frame by obtaining a set value of a sub pixel when the sub pixel belongs to the basic reference frame of the reference frame, and obtaining a value of a corresponding sub pixel with an x-coordinate determined by setting an x-coordinate of the sub pixel to a value obtained by adding a distance on an x-axis between a border of the basic reference frame adjacent to the sub pixel and the sub pixel to an x-coordinate of an opposite border of the basic reference frame, when the sub pixel is located outside the left border of the basic reference frame, and by subtracting the distance from the x-coordinate of the opposite border when the sub pixel is located outside the right border of the basic reference frame; and reproducing the current data unit using the values of the pixels of the reference data unit;

wherein the padding, receiving, determining, and reproducing steps are carried out by a processor.

14. An apparatus for compensating for a motion of a panorama image containing 360° omni-directional view information, the apparatus comprising:

a memory for storing a reference frame obtained by padding a padding region connected to the outer left side of a left border of a basic reference frame to be used for motion compensation for the panorama image, using corresponding pixel values of a right border region of the basic reference frame, padding a padding region connected to the outer right side of the right border of the basic reference frame using corresponding pixel values of a left border region thereof, and making a reference frame by expanding the basic reference frame including the padded regions, wherein the right border region is the region inside and adjacent the right border of the basic reference frame and the left border region is the region inside and adjacent the left border of the basic reference frame; and a motion compensating unit for receiving a motion vector of a current data unit of the panorama image; determining values of all pixels of a reference data unit indicated by the received motion vector from the reference frame by obtaining a set value of a sub pixel when the sub pixel belongs to the reference frame, obtaining a value of a corresponding sub pixel with an x-coordinate determined by setting an x-coordinate of the sub pixel to a value obtained by adding a distance on an x-axis between a border of the basic reference frame adjacent to the sub pixel and the sub pixel to an x-coordinate of an opposite border of the basic reference frame, when the sub pixel is located outside the left border of the reference frame, and subtracting the distance from the x-coordinate of the opposite border when the sub pixel is located outside the right border of the reference frame; and reproducing the current data unit using the pixel values of the reference data unit, wherein the motion compensating unit is controlled by a processor.

15. An apparatus for compensating for a motion of a panorama image containing 360° omni-directional view information, the apparatus comprising:

a memory for storing a reference frame obtained by padding a padding region connected to the outer left side of a left border of a basic reference frame to be used for compensation for the panorama image, using values of pixels of a left border region of the basic reference frame, padding a padding region connected to the outer right side of a right border region of the basic reference frame using values of pixels of a right border region thereof, and making a reference frame by expanding the basic reference frame including the padded regions, wherein the right border region is the region inside and adjacent the right border of the basic reference frame and the left border region is the region inside and adjacent the left border of the basic reference frame; and a motion compensating unit for receiving a motion vector of a current data unit of the panorama image; determining values of all pixels of a reference data unit indicated by the received motion vector from the reference frame by obtaining a set value of a sub pixel when the sub pixel belongs to the basic reference frame of the reference frame, obtaining a value of a corresponding sub pixel with an x-coordinate determined by setting an x-coordinate of the sub pixel to a value obtained by adding a distance on an x-axis between a border of the basic reference frame adjacent to the sub pixel and the sub pixel to an x-coordinate of an opposite border of the basic reference frame, when the sub pixel is located outside the left border of the basic reference frame, and subtracting the distance from the x-coordinate of the opposite border when the sub pixel is located outside the right border of the basic reference frame, and reproducing the current data unit using the pixel values of the reference data unit, wherein the motion compensating unit is controlled by a processor.

16. A computer readable medium having stored thereon computer executable instructions adapted to control a computer to perform a method of estimating a motion of a panorama image containing 360° omni-directional view information, the method comprising:

padding a padding region connected to the outer left side of the left border of a basic reference frame to be used for motion estimation of the panorama image, using corresponding pixel values of a right border region of the basic reference frame, padding a padding region connected to the outer right side of the right border of the basic reference frame using corresponding pixel values of a left border region thereof, and making a reference frame by expanding the basic reference frame including the padded regions, wherein the right border region is the region inside and adjacent the right border of the basic reference frame and the left border region is the region inside and adjacent the left border of the basic reference frame;

estimating a motion vector of a current data unit of the panorama image, using motion vectors of a plurality of previous data units adjacent to the current data unit;

determining values of all pixels of a reference data unit indicated by the estimated motion vector from the reference frame by obtaining a value of a sub pixel when the sub pixel belongs to the reference frame, and obtaining a value of a corresponding sub pixel with an x-coordinate determined by setting an x-coordinate of the sub pixel to a value obtained by adding a distance on an x-axis between a border of the basic reference frame adjacent to the sub pixel and the sub pixel to an x-coordinate of an opposite border of the basic reference frame, when the sub pixel is located outside the left border of the reference frame, and subtracting the distance from the x-coordinate of the opposite border when the sub pixel is located outside the right border of the reference frame; and determining a similarity between the current data unit and the reference data unit using a predetermined evaluation function.

17. The computer readable medium of claim 16, wherein when at least one of the plurality of the previous data units is present outside one of the left and right borders of the panorama image, the estimation of the motion vector of the current data unit comprises determining the plurality of the previous data units from a cylindrical image which is obtained by connecting the left and right borders of the panorama image.

18. The computer readable medium of claim 16, wherein the method further comprises:

determining a reference data unit which is the most similar to the current data unit in a predetermined search range; and determining a motion vector representing the determined reference data unit.

* * * * *